(12) United States Patent
Shimura

(10) Patent No.: US 8,026,802 B2
(45) Date of Patent: Sep. 27, 2011

(54) VEHICLE ABNORMALITY DETECTION METHOD AND DEVICE THEREOF AND SENSOR UNIT THEREOF

(75) Inventor: Kazuhiro Shimura, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 1151 days.

(21) Appl. No.: 11/720,600

(22) PCT Filed: Dec. 20, 2005

(86) PCT No.: PCT/JP2005/023319
§ 371 (c)(1),
(2), (4) Date: May 31, 2007

(87) PCT Pub. No.: WO2006/068113
PCT Pub. Date: Jun. 29, 2006

(65) Prior Publication Data
US 2008/0018445 A1    Jan. 24, 2008

(30) Foreign Application Priority Data

Dec. 24, 2004    (JP) ................... 2004-372666

(51) Int. Cl.
*B60C 23/00*    (2006.01)
(52) U.S. Cl. ........ 340/442; 340/443; 340/444; 340/445; 340/446; 340/447; 340/448; 73/146.4; 73/146.5; 73/146.8; 701/29
(58) Field of Classification Search ........... 340/442, 340/445, 446, 449; 73/146.4, 146.5, 146.8; 701/29
See application file for complete search history.

(56) References Cited

U.S. PATENT DOCUMENTS 3,111,644 A * 11/1963 Froelich et al. ............... 340/447
(Continued)

FOREIGN PATENT DOCUMENTS
JP    10-044976    2/1998
(Continued)

OTHER PUBLICATIONS

International Search Report for PCT/JP2005/023319 dated Mar. 28, 2006.

*Primary Examiner* — Benjamin C Lee
*Assistant Examiner* — Quang D Pham
(74) *Attorney, Agent, or Firm* — Knobbe Martens Olson & Bear LLP

(57) ABSTRACT

There is provided a vehicle abnormality detection method detecting an abnormal state in which a high temperature occurs due to maladjustment of a vehicle bearing mechanism section or vehicle brake mechanism section, and a device thereof and a sensor unit thereof. By use of the sensor unit 100 mounted in a rim 31, an air temperature within a tire 2 is sensed as a first temperature and a temperature (second temperature) of the rim 31 is sensed as a temperature related to at least one of a temperature of the vehicle bearing mechanism section and a temperature of the vehicle brake mechanism section 40. Then a temperature difference between the first and second temperatures is calculated and when the temperature difference is a predetermined value or more, it is determined that an abnormality has occurred in the vehicle bearing mechanism section or vehicle brake mechanism section 40. The abnormality is thus detected.

21 Claims, 19 Drawing Sheets

U.S. PATENT DOCUMENTS

| | | | | |
|---|---|---|---|---|
| 4,163,208 A * | 7/1979 | Merz | | 340/447 |
| 4,235,184 A * | 11/1980 | Schiavone | | 116/34 R |
| 4,649,370 A * | 3/1987 | Thomason | | 340/453 |
| 4,746,910 A * | 5/1988 | Pfister et al. | | 340/567 |
| 4,909,074 A * | 3/1990 | Gerresheim et al. | | 73/146.4 |
| 5,071,259 A * | 12/1991 | Metzger et al. | | 374/143 |
| 5,140,851 A * | 8/1992 | Hettich et al. | | 73/146.5 |
| 5,193,387 A * | 3/1993 | Hodate | | 73/146.5 |
| 5,274,355 A * | 12/1993 | Galan | | 340/445 |
| 5,353,020 A * | 10/1994 | Schurmann | | 340/870.31 |
| 5,513,525 A * | 5/1996 | Schurmann | | 73/146.5 |
| 5,587,698 A * | 12/1996 | Genna | | 340/442 |
| 5,603,570 A * | 2/1997 | Shimizu | | 374/100 |
| 5,629,676 A * | 5/1997 | Kartoun et al. | | 340/567 |
| 5,663,496 A * | 9/1997 | Handfield et al. | | 73/146.5 |
| 5,708,411 A * | 1/1998 | Hill | | 340/447 |
| 5,805,767 A * | 9/1998 | Jouas et al. | | 392/373 |
| 5,808,190 A * | 9/1998 | Ernst | | 73/146.5 |
| 5,883,305 A * | 3/1999 | Jo et al. | | 73/146.5 |
| 5,886,624 A * | 3/1999 | Hebert | | 340/442 |
| 5,936,155 A * | 8/1999 | Francois et al. | | 73/129 |
| 6,112,587 A * | 9/2000 | Oldenettel | | 73/146.5 |
| 6,194,998 B1 * | 2/2001 | Huang | | 340/442 |
| 6,271,748 B1 * | 8/2001 | Derbyshire et al. | | 340/442 |
| 6,278,363 B1 * | 8/2001 | Bezek et al. | | 340/442 |
| 6,292,095 B1 * | 9/2001 | Fuller et al. | | 340/442 |
| 6,320,450 B1 * | 11/2001 | Lee et al. | | 327/513 |
| 6,359,556 B1 * | 3/2002 | Katou | | 340/506 |
| 6,373,394 B1 * | 4/2002 | Zhang | | 340/584 |
| 6,486,771 B1 * | 11/2002 | Fuller et al. | | 340/442 |
| 6,498,967 B1 * | 12/2002 | Hopkins et al. | | 701/1 |
| 6,549,125 B2 * | 4/2003 | Nigon et al. | | 340/447 |
| 6,591,671 B2 * | 7/2003 | Brown | | 73/146.5 |
| 6,611,774 B1 * | 8/2003 | Zaccaria | | 702/63 |
| 6,664,890 B2 * | 12/2003 | Yamagiwa et al. | | 340/442 |
| 6,705,157 B2 * | 3/2004 | Fischer et al. | | 73/146 |
| 6,769,294 B2 * | 8/2004 | Yurjevich et al. | | 73/146 |
| 6,784,794 B1 * | 8/2004 | McQuade et al. | | 340/442 |
| 6,805,000 B1 * | 10/2004 | Sheikh-Bahaie | | 73/146.8 |
| 6,922,140 B2 * | 7/2005 | Hernando et al. | | 340/444 |
| 6,922,141 B2 * | 7/2005 | Saheki et al. | | 340/447 |
| 6,945,104 B2 * | 9/2005 | Uleski | | 73/146.8 |
| 6,963,273 B2 * | 11/2005 | O'Brien et al. | | 340/443 |
| 6,965,306 B2 * | 11/2005 | Tsujita et al. | | 340/448 |
| 7,019,628 B2 * | 3/2006 | Ichinose | | 340/442 |
| 7,075,419 B2 * | 7/2006 | Watabe | | 340/447 |
| 7,075,421 B1 * | 7/2006 | Tuttle | | 340/449 |
| 7,091,840 B2 * | 8/2006 | Ichinose | | 340/447 |
| 7,137,296 B2 * | 11/2006 | Shida et al. | | 73/146.5 |
| 7,187,272 B2 * | 3/2007 | Katou | | 340/442 |
| 7,196,615 B2 * | 3/2007 | Nicot et al. | | 340/442 |
| 7,242,285 B2 * | 7/2007 | Shaw | | 340/449 |
| 7,338,201 B2 * | 3/2008 | Shepherd et al. | | 374/1 |
| 7,348,879 B2 * | 3/2008 | Nakatani et al. | | 340/442 |
| 7,391,307 B2 * | 6/2008 | Kuwajima | | 340/442 |
| 7,391,308 B2 * | 6/2008 | Iwazumi | | 340/442 |
| 7,543,489 B2 * | 6/2009 | Abe et al. | | 73/146 |
| 7,562,566 B2 * | 7/2009 | Liao | | 73/146 |
| 7,563,021 B2 * | 7/2009 | Ichihara et al. | | 374/46 |
| 2001/0030601 A1 * | 10/2001 | Nigon et al. | | 340/445 |
| 2001/0045520 A1 * | 11/2001 | Asano et al. | | 250/342 |
| 2002/0053418 A1 * | 5/2002 | Hirano | | 165/10 |
| 2002/0104717 A1 * | 8/2002 | Borugian | | 188/1.11 E |
| 2003/0006890 A1 * | 1/2003 | Magiawala et al. | | 340/438 |
| 2003/0070477 A1 * | 4/2003 | Fischer et al. | | 73/146 |
| 2003/0136908 A1 * | 7/2003 | Pfister et al. | | 250/338.1 |
| 2004/0004549 A1 * | 1/2004 | Wilson | | 340/584 |
| 2004/0046649 A1 * | 3/2004 | Sanchez et al. | | 340/443 |
| 2004/0095231 A1 * | 5/2004 | Ichinose | | 340/442 |
| 2004/0155764 A1 * | 8/2004 | Ichinose | | 340/447 |
| 2004/0164647 A1 * | 8/2004 | Micko | | 310/319 |
| 2005/0001716 A1 * | 1/2005 | Yamashita et al. | | 340/442 |
| 2005/0045259 A1 * | 3/2005 | Hottebart et al. | | 152/415 |
| 2005/0078002 A1 * | 4/2005 | Okubo | | 340/445 |
| 2005/0088292 A1 * | 4/2005 | O'Brien et al. | | 340/443 |
| 2005/0139687 A1 * | 6/2005 | Lin et al. | | 236/1 C |
| 2005/0172707 A1 * | 8/2005 | Kanatani et al. | | 73/146 |
| 2005/0200464 A1 * | 9/2005 | Bennie et al. | | 340/442 |
| 2006/0006994 A1 * | 1/2006 | Moser | | 340/448 |
| 2006/0082451 A1 * | 4/2006 | Shaw | | 340/449 |
| 2006/0208863 A1 * | 9/2006 | Kuwajima | | 340/442 |
| 2006/0220812 A1 * | 10/2006 | Luce | | 340/442 |
| 2007/0055411 A1 * | 3/2007 | Nihei et al. | | 701/1 |
| 2007/0223949 A1 * | 9/2007 | Yamane | | 399/50 |

FOREIGN PATENT DOCUMENTS

| | | |
|---|---|---|
| JP | 2002-103931 | 4/2002 |
| JP | 2003-121281 | 4/2003 |
| JP | 2003-228743 | 8/2003 |
| JP | 2004-237951 | 8/2004 |

* cited by examiner

Time (hour: minute: second) from starting of vehicle running

Time (hour: minute: second) from starting of vehicle running

VEHICLE ABNORMALITY DETECTION METHOD AND DEVICE THEREOF AND SENSOR UNIT THEREOF

CROSS REFERENCE TO RELATED APPLICATIONS

This application claims to benefit and priority to and is a U.S. National Phase of PCT International Application Number PCT/JP2005/023319, filed on Dec. 20, 2005, designating the United States of America, which claims priority under U.S.C. §119 to Japanese Application 2004-372666 filed on Dec. 24, 2004. The disclosures of the above-referenced applications are hereby incorporated by this reference in their entirety.

TECHNICAL FIELD

The present invention relates to a vehicle abnormality detection method for detecting an abnormality of a vehicle tire and more particularly, of an axle bearing or a brake, and to a device thereof and a sensor unit thereof.

BACKGROUND ART

Conventionally, when an abnormality occurs in tire air pressure during running of a vehicle, this may cause an accident; there have thus been developed devices automatically monitoring the tire air pressure to raise an alarm when an abnormality occurs in the tire air pressure. For example, a device disclosed in Japanese Patent Publication No. 2003-121281 (Patent Document 1) includes a wheel for mounting a tire, a tire pressure sensing unit and a display unit. The tire pressure sensing unit is arranged in a sensing unit housing slot formed at a predetermined position of a corresponding surface abutting on a tubeless tire of a wheel. Information obtained by sensing a tire pressure is outputted to the display unit as a signal, and the display unit displays the information on tire pressure.

When this device is used, the driver can perceive an abnormal phenomenon such as decrease or increase of the tire pressure at any time before running or during running and early perform a tire inspection or emergency measure.

Further, an abnormality monitoring device for a pneumatic tire disclosed in Japanese Patent Publication No. 2002-103931 (Patent Document 2) includes: a temperature sensing and transmitting unit arranged in a tire air chamber for sensing a temperature in the tire air chamber and transmitting by wireless the sensed temperature information to the outside of the tire; and a burst occurrence prediction unit arranged outside the tire for applying an arithmetic processing to the temperature information and raising an alarm when an abnormality is detected. The burst occurrence prediction unit includes a receiving device receiving the temperature information transmitted from the temperature sensing and transmitting unit, a memory section accumulating the temperature information as time sequence data at a predetermined time interval, a filter section for eliminating abnormal data from the time sequence data, a comparison calculation section comparing a difference between data of plural tires and a difference between change ratios thereof and comparing those with standard values to transmit abnormality information when an abnormality is detected, and an alarm transmitting section receiving the abnormality information and raising a burst alarm.

While this device is comparatively simple, the air chamber internal temperature of each tire can be accurately grasped to thereby predict appropriately an occurrence of burst.

Also, when the brake of the tire is abnormally heated, this may lower the braking force, causing an accident; there have thus been developed devices automatically monitoring a temperature of a tire brake and raising an alarm when an abnormality occurs in brake temperature. For example, a brake heating alarming device disclosed in Japanese Patent Publication No. 10-44976 (Patent Document 3) includes a temperature sensor measuring a temperature of a tire brake, a unit comparing a difference between the brake temperature measured by the temperature sensor and the brake temperature measured after the lapse of a given time relative to the precedent measurement with a preliminarily set value, and a unit raising an alarm in response to the comparison result.

According to this device, the driver can be notified about brake heating caused by an excessive use of the brake, and the braking force can thus be prevented from lowering and also, the brake parts can be prevented from wearing out.

Patent Document 1: Japanese Patent Publication No. 2003-121281

Patent Document 2: Japanese Patent Publication No. 2002-103931

Patent Document 3: Japanese Patent Publication No. 10-44976

Generally, in a leading drum brake used often in trucks or buses, if adjustment is erroneously made, even when the brake is not activated, the brake shoe is opened due to self servo effect that the brake has in principle, thus generating frictional heat.

More specifically, as illustrated in FIG. 26, a drum brake 1 includes a wheel cylinder 12 secured to a back plate 11, connecting rods 13a and 13b, an adjuster bolt 13c, a parking brake lever 14, brake springs 15a and 15b, an adjuster spring 15c, an adjuster lever 16, brake shoes 17A and 17B, and a brake drum 18. The brake shoes 17A and 17B having applied thereto a frictional material called a lining (not illustrated) are pressed against the inner side of the brake drum 18 rotating along with the vehicle tire/wheel, and frictional effect caused by this allows deceleration.

Also, the major characteristic of the drum brake is its self servo effect (self boosting effect); that is, when the brake shoes 17A and 17B are pressed against the rotating brake drum 18, force biting into (force pulled into) the brake drum 18 is generated, whereby the brake drum 18 is pressed by stronger force, thus generating stronger braking force.

However, if adjustment of a gap between the brake shoes 17A and 17B and the brake drum 18 is erroneously made using the adjuster bolt 13c and the adjuster lever 16, even when the brake is not activated, the brake shoes 17A and 17B are opened due to the self servo effect and dragged by the brake drum 18, generating frictional heat.

Also, in bearings used in an axle bearing mechanism, when grease filling amount or pressurization is erroneously applied, frictional resistance associated with rotation increases, thus raising temperature.

These phenomena not only increase running resistance of the vehicle, resulting in low mileage, but also raise the temperature of the tire made from rubber being a material easily affected by heat, leading to a burst of the tire at worst.

Similarly to the drum brake described above, in a disk brake, also, maladjustment may cause heating. More specifically, regarding a disk brake device, when it comes to a vehicle provided with Anti Lock Brake System (ABS) proliferating rapidly in recent years, the upper threshold of regular liquid pressure is raised due to mounting of a liquid pressure booster; thus when liquid pressure is lowered in a region exceeding a conventional regular liquid pressure, since piston return amount is insufficient, the pad contacts the brake disk during rotating at the time of non-braking, causing a phenomenon of dragging the pad. Frictional heat is generated by such pad dragging.

The present invention addresses the above problem, with the object of providing a vehicle abnormality detection method for detecting an abnormality in which a high temperature is generated due to maladjustment of a vehicle axle bearing mechanism section or vehicle brake mechanism section, and a device thereof and a sensor unit thereof.

DISCLOSURE OF THE INVENTION

To achieve the above object, the present invention proposes a vehicle abnormality detection method for using a vehicle abnormality detection device to detect an abnormality of at least one of a vehicle bearing mechanism section and a vehicle brake mechanism section in a vehicle provided with a tire including a tire wheel and a tire body mounted in the tire wheel.

According to the abnormality detection method of the present invention, the abnormality detect ion device senses as a first temperature any one of an air temperature within tire and a tire body temperature, senses as a second temperature a temperature related to at least one of a temperature of the vehicle bearing mechanism section and a temperature of the vehicle brake mechanism section. Further, the abnormality detection device calculates a temperature difference between the first and second temperatures and determines, upon the temperature difference being a predetermined value or more, that an abnormality has occurred in the vehicle bearing mechanism section or the vehicle brake mechanism section and thereby detects the abnormality.

Heat is generated by friction between the tire body and road surface during running of the vehicle, and the tire body temperature and the air temperature within tire being the first temperature rise. However, when there is generated a high temperature ascribable to frictional heat in the vehicle bearing mechanism section or vehicle brake mechanism section due to maladjustment of the vehicle bearing mechanism section or vehicle brake mechanism section, the second temperature related to the vehicle bearing mechanism section temperature or vehicle brake mechanism section temperature rises significantly higher than the first temperature.

Also, with respect to the air temperature within tire and tire body temperature, even when the vehicle bearing mechanism section temperature or vehicle brake mechanism section temperature rises, no steep temperature change associated therewith occurs. Thus the temperature difference between the first and second temperatures increases. When this temperature difference is a predetermined value or more, it is determined that an abnormality has occurred, whereby the abnormality is detected.

Also, the present invention proposes the vehicle abnormality detection method described above, wherein the abnormality detection device senses as the second temperature a temperature of the tire wheel.

According to the present invention, a tire wheel temperature is sensed as the second temperature. In a case where a drum brake is contained in the inner side of the tire wheel, for example, and the vehicle bearing mechanism section is arranged in the vicinity of the drum brake, when dragging occurs between the brake shoe and brake drum, or frictional resistance in the bearing mechanism section rises to raise the temperature, then the tire wheel temperature rises accordingly. Therefore, an abnormality such as a trouble or maladjustment of the vehicle bearing mechanism section or vehicle brake mechanism section can be detected.

Also, in a case where the brake is a disk brake, when braking is stopped, an operation of returning the piston is performed to cause the pad to distance it from the disk. However, when the piston seal is contaminated, even when braking is stopped to separate the pad from the disk, the pad is dragged while still in contact with the disk, thus raising the temperature. In such case, detection thereof can be performed.

Also, the present invention proposes the vehicle abnormality detection method described above, wherein the abnormality detection device senses as the first temperature an air temperature within tire.

According to the present invention, an air temperature within tire is detected as the first temperature.

Also, the present invention proposes the vehicle abnormality detection method described above, wherein the abnormality detection device detects braking of the vehicle and then stops the abnormality detection for a predetermined time period after detecting the vehicle braking.

According to the present invention, for a predetermined time period after detecting the vehicle braking, the abnormality detection is stopped, so abnormality detection ascribable to temperature rise of the vehicle brake mechanism section associated with normal braking is prevented.

Also, the present invention proposes the vehicle abnormality detection method described above, wherein the abnormality detection device raises an alarm to a driver when the abnormality is detected.

According to the present invention, an alarm is raised to the driver when the abnormality is detected, so the driver can quickly perceive the occurrence of abnormality and an accident such as fire or burst of the tire can be prevented from occurring.

Also, the present invention proposes the vehicle abnormality detection method described above, wherein the abnormality detection device raises an alarm to the driver when one of the first and second temperatures reaches a respective predetermined threshold temperature preliminarily set or more.

According to the present invention, when the air temperature within tire or the tire itself temperature being the first temperature is a predetermined threshold temperature or more, or when the temperature related to at least one of the vehicle bearing mechanism section temperature and vehicle brake mechanism section temperature is a predetermined threshold temperature or more, an alarm is raised. Accordingly, a temperature of the tire itself or vehicle bearing mechanism section, or an abnormality of the vehicle brake mechanism section can be detected, so the driver can quickly perceive the occurrence of abnormality and an accident such as fire or burst of the tire can be prevented from occurring.

Also, to achieve the above object, the present invention proposes a vehicle abnormality detection device detecting an abnormality of at least one of a vehicle bearing mechanism section or a vehicle brake mechanism section in a vehicle provided with a tire including a tire wheel and a tire body mounted in the tire wheel, the device including: a first temperature sensing element sensing as a first temperature any one of an air temperature within tire and a tire body temperature; a second temperature sensing element sensing as a second temperature a temperature related to at least one of a temperature of the vehicle bearing mechanism section and a temperature of the vehicle brake mechanism section; means for calculating the temperature difference between the first and second temperatures; and means for determining, upon the temperature difference being a predetermined value or more, that an abnormality has occurred in the vehicle bearing mechanism section or the vehicle brake mechanism section and thereby detecting the abnormality.

Heat is generated by friction between the tire body and road surface during running of the vehicle, and the tire body temperature and the air temperature within tire being the first temperature rises. However, when there is generated a high temperature ascribable to frictional heat in the vehicle bearing mechanism section or vehicle brake mechanism section due to maladjustment of the vehicle bearing mechanism section or vehicle brake mechanism section, the second temperature related to the vehicle bearing mechanism section temperature or vehicle brake mechanism section temperature rises significantly higher than the first temperature. Also, with respect to the air temperature within tire and tire body temperature, even when the vehicle bearing mechanism section temperature or vehicle brake mechanism section temperature rises, no steep temperature change associated therewith occurs. Thus the temperature difference between the first and second temperatures increases. When this temperature difference reaches a predetermined value or more, it is determined that an abnormality has occurred, whereby the abnormality is detected by the abnormality detection device of the present invention.

Also, the present invention proposes the vehicle abnormality detection device described above, wherein the second temperature sensing element is arranged to sense a temperature of the tire wheel as the second temperature.

According to the present invention, a tire wheel temperature is sensed as the second temperature. In a case where a drum brake is contained in the inner side of the tire wheel, for example, and the vehicle bearing mechanism section is arranged in the vicinity of the drum brake, when dragging occurs between the brake shoe and brake drum, or frictional resistance in the bearing mechanism section increases to raise the temperature, then the tire wheel temperature rises accordingly. Therefore, an abnormality such as a trouble or maladjustment of the vehicle bearing mechanism section or vehicle brake mechanism section can be detected.

Also, in a case where the brake is a disk brake, when braking is stopped, an operation of returning the piston is performed to cause the pad to distance it from the disk. However, when the piston seal is contaminated, even when braking is stopped to separate the pad from the disk, the pad is dragged while still in contact with the disk, thus raising the temperature. In such case, detection thereof can be performed.

Also, the present invention proposes the vehicle abnormality detection device described above, wherein the first temperature sensing element senses as the first temperature an air temperature within tire.

According to the present invention, an air temperature within tire is sensed as the first temperature.

Also, the present invention proposes the vehicle abnormality detection device described above, further including: means for detecting braking of the vehicle; and means for stopping the abnormality detection for a predetermined time period after detecting the vehicle braking.

According to the present invention, for a predetermined time period after detecting the vehicle braking, the abnormality detection is stopped, so abnormality detection ascribable to temperature rise of the vehicle brake mechanism section associated with normal braking is prevented.

Also, the present invention proposes the vehicle abnormality detection device described above, further including means for raising an alarm to a driver when the abnormality is detected.

According to the present invention, an alarm is raised to the driver when the abnormality is detected, so the driver can quickly perceive the occurrence of abnormality and an accident such as fire or burst of the tire can be prevented from occurring.

Also, the present invention proposes the vehicle abnormality detection device described above, further including means for raising an alarm to the driver when one of the first and second temperatures reaches a respective predetermined threshold temperature preliminarily set or more.

According to the present invention, when the air temperature within tire or the tire body temperature being the first temperature reaches a predetermined threshold temperature or more, or when the temperature related to at least one of the vehicle bearing mechanism section temperature and vehicle brake mechanism section temperature reaches a predetermined threshold temperature or more, an alarm is raised. Accordingly, a temperature of the tire itself or vehicle bearing mechanism section, or an abnormality of the vehicle brake mechanism section can be detected, so the driver can quickly perceive the occurrence of abnormality and an accident such as fire or burst of the tire can be prevented from occurring.

Also, the present invention proposes the vehicle abnormality detection device described above, including a sensor unit and an abnormality detection unit, wherein: the sensor unit has the first temperature sensing element, the second temperature sensing element and means for converting into a signal, information on first temperature sensed by the first temperature sensing element and information on second temperature sensed by the second temperature sensing element and for transmitting the signal; and the abnormality detection unit has means for receiving the signal transmitted from the sensor unit to obtain the information on first temperature and the information on second temperature from the received signal, means for calculating based on the obtained information a temperature difference between the first and second temperatures, and means for determining, upon the temperature difference being a predetermined value or more, that an abnormality has occurred in the vehicle bearing mechanism section or the vehicle brake mechanism section and thereby detecting the abnormality.

According to the present invention, an air temperature within tire or a tire body temperature being the first temperature is sensed by the first temperature sensing element of the sensor unit, a temperature related to at least one of a vehicle bearing mechanism section temperature and a vehicle brake mechanism section temperature is sensed by the second temperature sensing element. The information on first and second temperatures is converted into a signal and transmitted from the sensor unit.

Further, the signal transmitted from the sensor unit is received by the abnormality detection unit. In the abnormality detection unit, the information on first temperature and the information on second temperature are obtained from the received signal and based on the obtained information, a temperature difference between the first and second temperatures is calculated. When the temperature difference is a predetermined value or more, it is determined by the abnormality detection unit that an abnormality has occurred in the vehicle bearing mechanism section or vehicle brake mechanism section, whereby the abnormality is detected.

Also, the present invention proposes the vehicle abnormality detection device described above, wherein the sensor unit has means for transmitting the signal at a predetermined time interval.

According to the present invention, a signal is transmitted from the sensor unit at a predetermined time interval, so power consumption of the sensor unit required to transmit the signal can be reduced.

Also, the present invention proposes the vehicle abnormality detection device described above, wherein the sensor unit is constituted of a unit body arranged in the exterior of a tire air chamber and the first and second temperature sensing elements arranged in the exterior of the unit body, connected to the unit body via an electric wire and disposed in the interior of the tire air chamber.

According to the present invention, the sensor unit is constituted of the unit body and the first and second temperature sensing elements; the unit body is arranged in the exterior of the tire air chamber; the first and second temperature sensing elements are arranged in the interior of the tire air chamber and connected to the unit body via the electric wire.

Also, the present invention proposes the vehicle abnormality detection device described above, wherein: the unit body is formed integrally with a valve stem; and the electric wire connecting the unit body with the first and second temperature sensing elements is installed through an opening of the valve stem.

According to the present invention, since the unit body is formed integrally with the valve stem, the unit body can be easily installed by mounting the valve stem. Further, since the electric wire connecting the unit body with the first and second temperature sensing elements is installed through an opening of the valve stem, additional wiring route need not be arranged.

Also, the present invention proposes the vehicle abnormality detection device described above, wherein the sensor unit is constituted of the unit body provided with the first temperature sensing element, and the second temperature sensing element arranged in the exterior of the unit body and connected to the unit body via an electric wire.

According to the present invention, the sensor unit is constituted of the unit body provided with the first temperature sensing element, and the second temperature sensing element; the second temperature sensing element is arranged in the exterior of the unit body and connected to the unit body via an electric wire.

Also, the present invention proposes the vehicle abnormality detection device described above, wherein: the sensor unit has means for transmitting a signal by electromagnetic wave; and the abnormality detection unit has means for receiving the radio wave transmitted from the sensor unit to obtain the signal.

According to the present invention, a signal is transmitted from the sensor unit to the abnormality detection unit by radio wave, so there is no need for a wiring connecting the sensor unit and the abnormality detection unit.

Also, the present invention proposes the vehicle abnormality detection device described above, including a first sensor unit, a second sensor unit and the abnormality detection unit, wherein: the first sensor unit has the first temperature sensing element and means for converting into a signal, information on first temperature sensed by the first temperature sensing element and for transmitting the signal; the second sensor unit has the second temperature sensing element and means for converting into a signal, information on second temperature sensed by the second temperature sensing element and for transmitting the signal; and the abnormality detection unit has means for receiving the signal transmitted from the first sensor unit and the signal transmitted from the second sensor unit to obtain from the received signals, the information on first temperature and the information on second temperature, means for calculating based on the obtained information a temperature difference between the first temperature and the second temperature, and means for determining, upon the temperature difference being a predetermined value or more, that an abnormality has occurred in the vehicle bearing mechanism section or the vehicle brake mechanism section, and thereby detecting the abnormality.

According to the present invention, for example, the first sensor unit is arranged at a position where the tire body temperature and air temperature within tire can be sensed; the second sensor unit is arranged at a position where the second temperature related to a temperature of the vehicle bearing mechanism section or vehicle brake mechanism section can be sensed.

Accordingly, by use of the first sensor unit, the information on first temperature sensed by the first temperature sensing element is converted into a signal and transmitted; by use of the second sensor unit, the information on second temperature sensed by the second temperature sensing element is converted in a signal and transmitted.

Further, by use of the abnormality detection unit, a signal transmitted from the first sensor unit and a signal transmitted from the second sensor unit are received, and information on first temperature and information on second temperature are obtained from the received signals, and based on the obtained information, a temperature difference between the first temperature and second temperature is determined, and when the temperature difference is a predetermined value or more, it is determined that an abnormality has occurred in the vehicle bearing mechanism section or vehicle brake mechanism section, whereby the abnormality is detected.

Also, the present invention proposes the vehicle abnormality detection device described above, wherein the first sensor unit and the second sensor unit each have means for transmitting a signal at a predetermined time interval.

According to the present invention, a signal is transmitted at a predetermined time interval from each of the first sensor unit and the second sensor unit, so power consumption of each of the first sensor unit and the second sensor unit required to transmit the signal can be reduced.

Also, the present invention proposes the vehicle abnormality detection device described above, wherein: the first sensor unit has means for transmitting a first temperature information signal by radio wave; the second sensor unit has means for transmitting a second temperature information signal by radio wave; and the abnormality detection unit has means for receiving the radio wave transmitted from the first sensor unit and the second sensor unit to obtain the first temperature information signal and the second temperature information signal.

According to the present invention, a signal is transmitted by radio wave from each of the first sensor unit and the second sensor unit to the abnormality detection unit, so there is no need for a wiring connecting each of the first sensor unit and the second sensor unit with abnormality detection unit.

Also, the present invention proposes a sensor unit used in a vehicle abnormality detection device detecting an abnormality of at least one of a vehicle bearing mechanism section or a vehicle brake mechanism section in a vehicle provided with a tire including a tire wheel and a tire body mounted in the time wheel, the sensor unit including a housing containing constituent parts and constituting means of the sensor unit and mounted in an inner side of a tire air chamber of the tire wheel, the housing having an opening communicating the inner side of the tire air chamber with the first temperature sensing element and heat transfer means for transferring heat of the tire wheel to the second temperature sensing element.

According to the vehicle abnormality detection method and the abnormality detection device of the present invention, heat is generated by friction between the tire body and road surface during running of the vehicle, and the tire body temperature and the air temperature within tire being the first temperature rise. However, when there is generated a high temperature ascribable to frictional heat in the vehicle bearing mechanism section or vehicle brake mechanism section due to maladjustment of the vehicle bearing mechanism section or vehicle brake mechanism section, the second temperature related to the vehicle bearing mechanism section temperature or vehicle brake mechanism section temperature rises significantly higher than the first temperature. Therefore, with respect to the air temperature within tire and tire body temperature, even when the vehicle bearing mechanism section temperature or vehicle brake mechanism section temperature rises, no steep temperature change associated therewith occurs. Thus the temperature difference between the first and second temperatures increases. When this temperature difference reaches a predetermined value or more, it is determined that an abnormality has occurred, whereby the abnormality is detected. Consequently, the increase of frictional resistance caused by maladjustment of the brake or maladjustment of the bearing mechanism section and heating associated therewith can be early discovered; thus, low mileage during running of the vehicle, or fire or burst of the tire can be prevented from occurring.

DESCRIPTION OF SYMBOLS

1 . . . drum brake, 11 . . . back plate, 12 . . . wheel cylinder, 13*a*, 13*b* connecting rod, 13*c* . . . adjuster bolt, 14 . . . parking brake lever, 15*a*, 15*b* . . . brake spring, 15*c* . . . adjuster spring, 16 . . . adjuster lever, 17A, 17B . . . brake shoe, 18 . . . brake drum, 2 . . . tire, 21 . . . tire body, 22 . . . tire air chamber, 3 . . . axle, 30 . . . wheel, 31 . . . rim, 40 . . . drum brake mechanism section, 41 . . . brake drum, 42 . . . brake shoe, 43 . . . wheel cylinder, 44 . . . back plate, 50 . . . bearing mechanism section, 61 . . . lower arm, 62 . . . damper, 63 . . . transverse yoke, 64 . . . knuckle, 100 . . . sensor unit, 100A . . . first sensor unit, 100B . . . second sensor unit, 101 . . . housing, 101*a*, 101*b* . . . housing member, 102 . . . opening, 103 . . . printed circuit board, 104 . . . opening, 105*a*, 105*b* protrusion, 110 . . . sensor module, 110*a* . . . sensing-use protrusion, 111 pressure sensing element, 112 . . . first temperature sensing element, 120 . . . second temperature sensing element, 121 . . . sensing-use protrusion, 130 . . . control IC, 131 . . . CPU, 132 . . . memory circuit, 133 to 135 . . . A/D converter circuit, 140 . . . setting-use coil antenna, 150 . . . transmitting IC, 151 . . . transmitting circuit, 160 ... battery, 170 ... transmitting antenna, 200 ... monitoring device, 201 ... receiving antenna, 202 ... receiving circuit, 203 ... CPU, 204 ... memory circuit, 205 ... control unit, 206 ... display unit, 207 ... power source unit, 410 ... engine, 411 ... accelerator pedal, 412 ... sub throttle actuator, 413 ... main throttle position sensor, 414 ... sub throttle position sensor, 421 ... steering wheel, 422 ... rudder angle sensor, 510, 520 ... sensor sensing a tire rotation number, 610 ... brake pedal, 620 ... brake-use master cylinder, 630 ... pressure control valve controlling brake-use oil pressure, 640 ... brake drive actuator, 700 ... stability control unit, 810 ... pedestal, 811 ... bottom plate, 812 ... support, 813 ... opening, 814 ... through hole, 820 ... stainless band, 821 ... opening, 830 ... tie wrap, 840 ... adhesive, 900 ... disk brake mechanism section, 901 ... brake disk (disk), 902 ... caliper, 903 ... piston, 904 ... pad, 905 seal groove, 906 ... piston seal

BEST MODE FOR CARRYING OUT THE INVENTION

An embodiment of the present invention will be described below.

Figure 1:
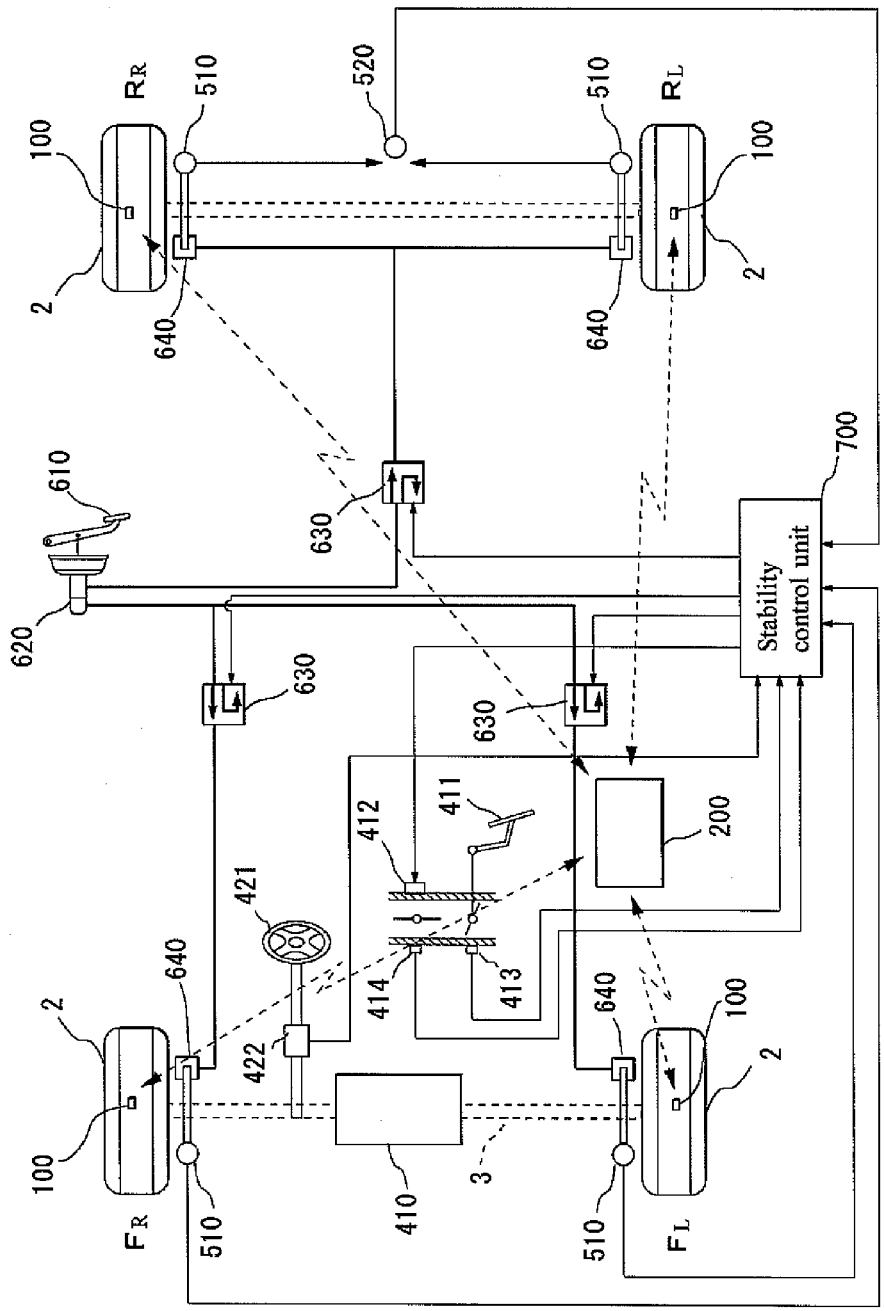
FIG. 1 is a view for explaining the overall configuration of a vehicle abnormality detection device according to a first embodiment of the present invention.
Figure 2:
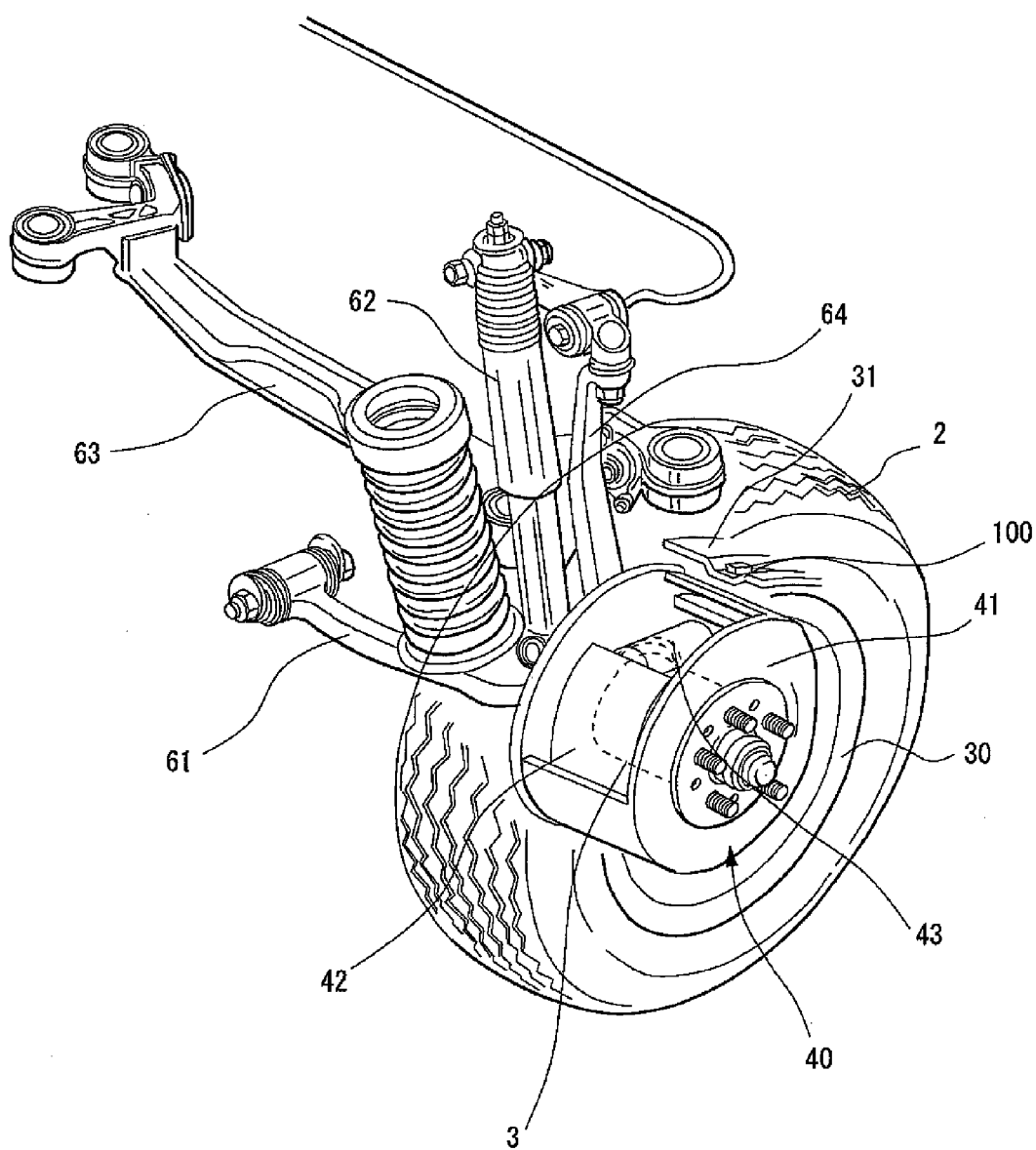
FIG. 2 is a perspective view illustrating a vehicle brake mechanism section according to the first embodiment of the present invention.
Figure 3:
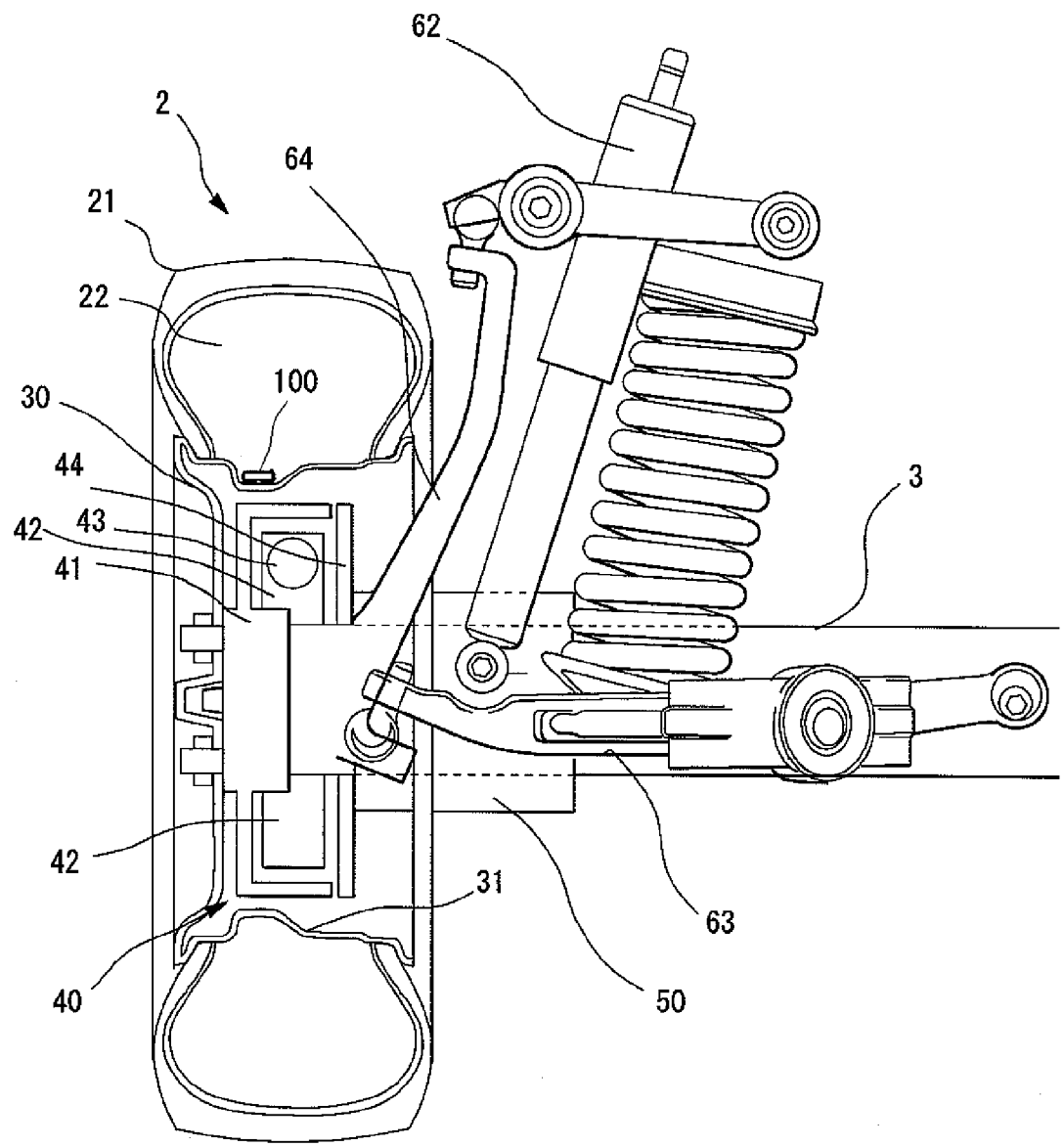
FIG. 3 is a side view illustrating the vehicle brake mechanism section according to the first embodiment of the present invention.
Figure 4:
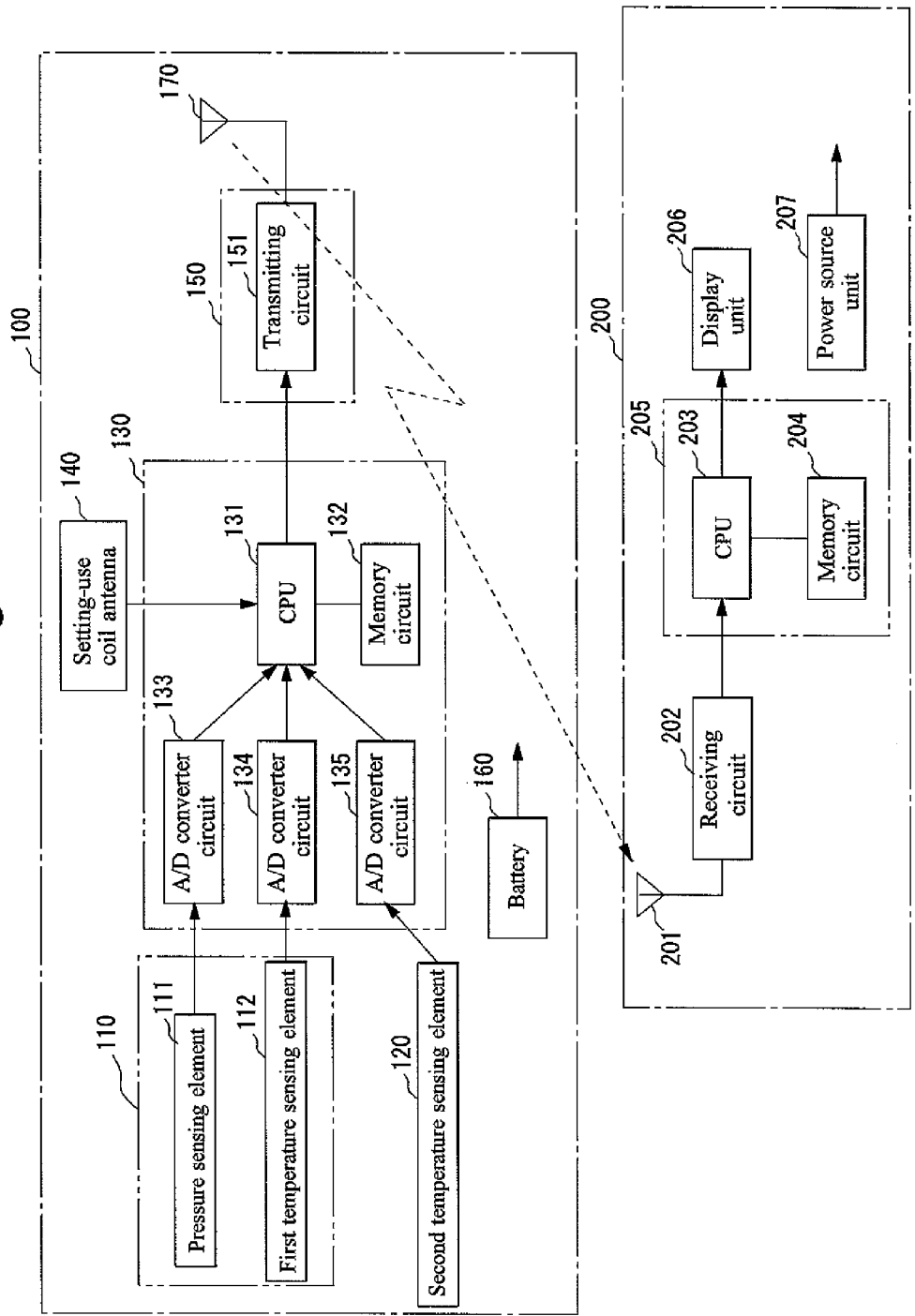
FIG. 4 is a block diagram of electrical circuit illustrating the vehicle abnormality detection device according to the first embodiment of the present invention.
Figure 5:
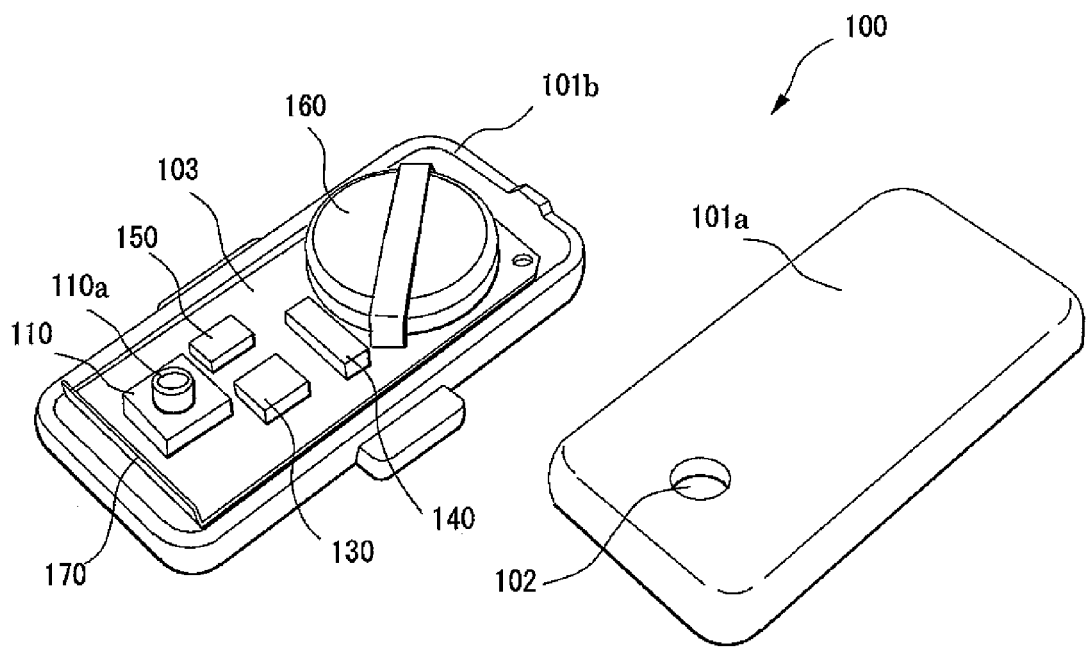
FIG. 5 is a configuration diagram illustrating a specific example of a sensor unit according to the first embodiment of the present invention.
Figure 6:
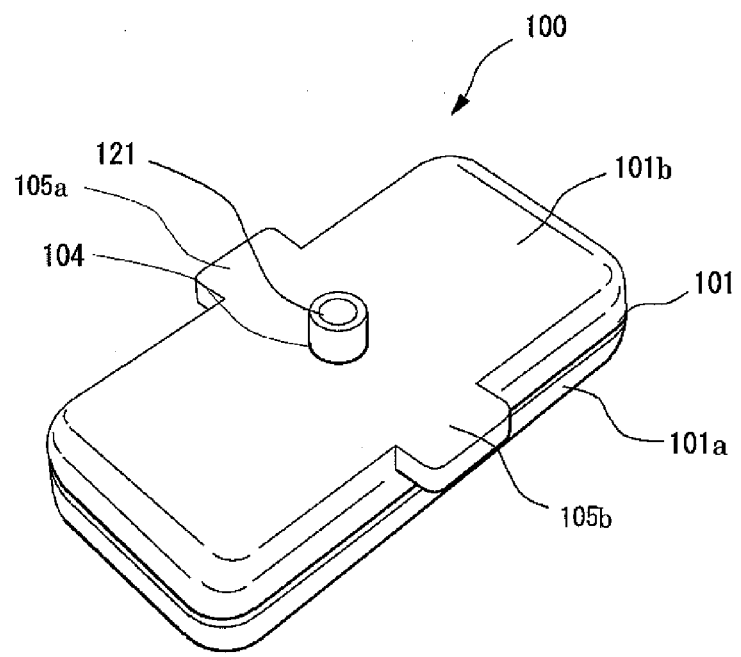
FIG. 6 is a configuration diagram illustrating a specific example of the sensor unit according to the first embodiment of the present invention.
Figure 7:
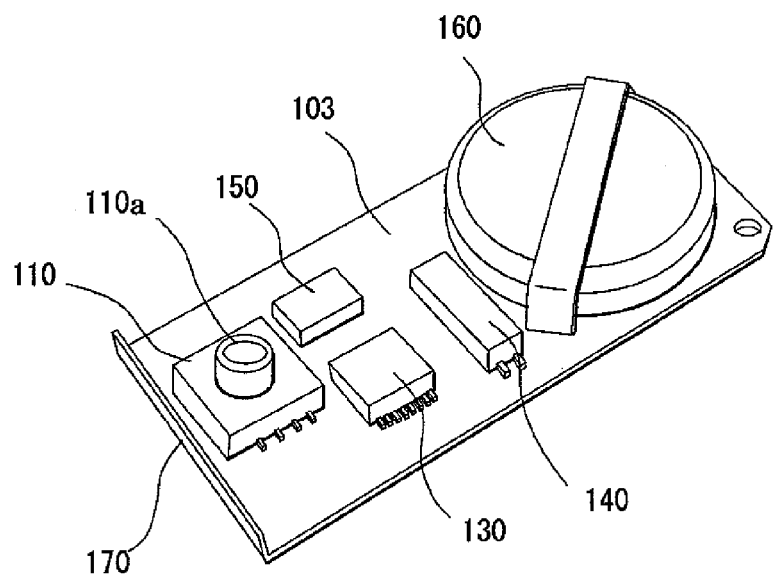
FIG. 7 is a configuration diagram illustrating a specific example of the sensor unit according to the first embodiment of the present invention.
Figure 8:
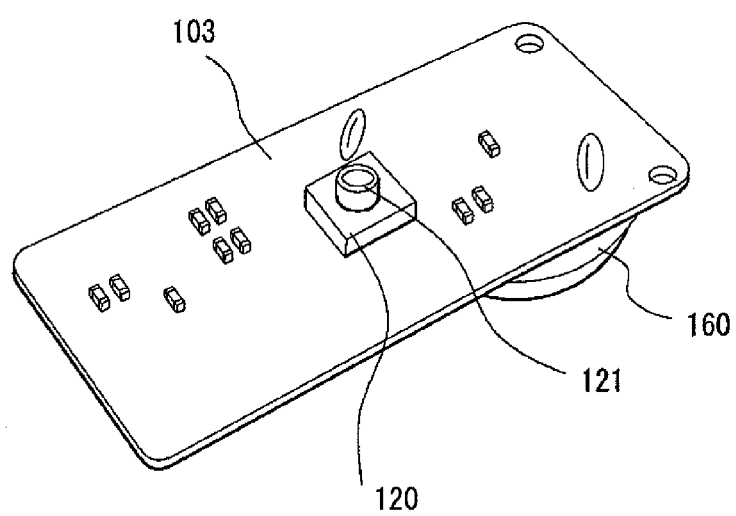
FIG. 8 is a configuration diagram illustrating a specific example of the sensor unit according to the first embodiment of the present invention.
Figure 9:
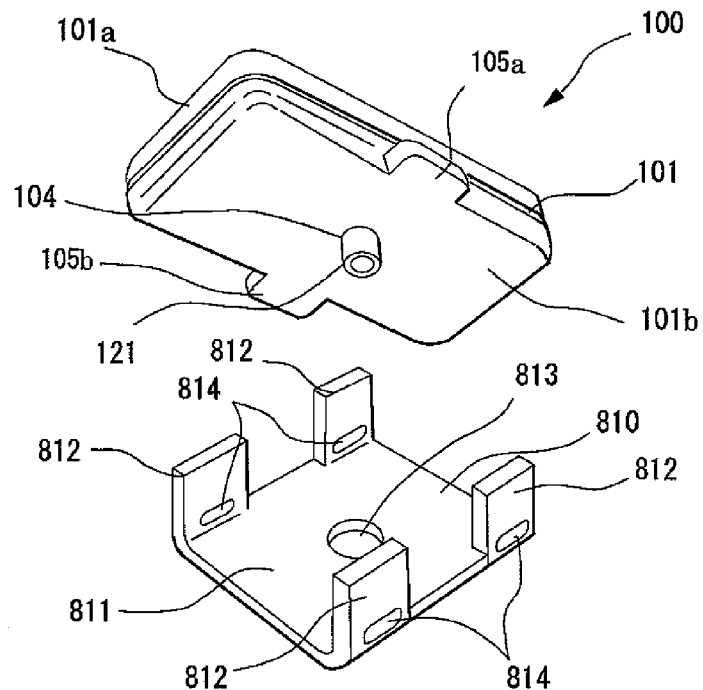
FIG. 9 is a view illustrating an example of mounting the sensor unit onto a rim according to the first embodiment of the present invention.
Figure 10:
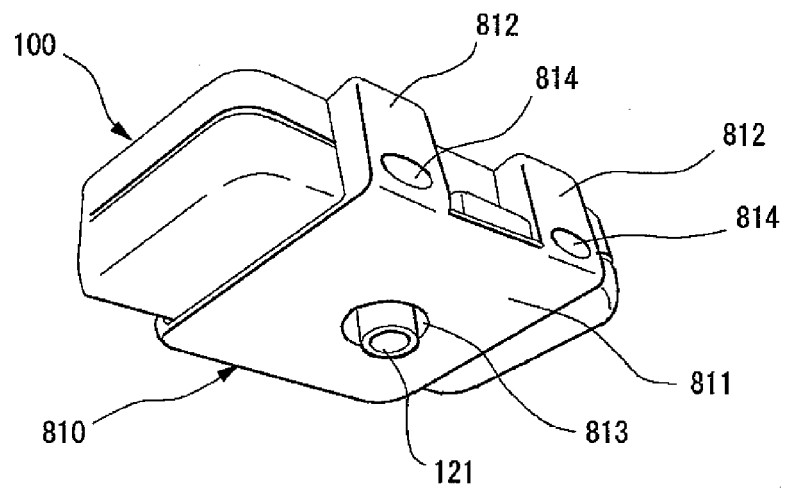
FIG. 10 is a view illustrating an example of mounting the sensor unit onto the rim according to the first embodiment of the present invention.
Figure 11:
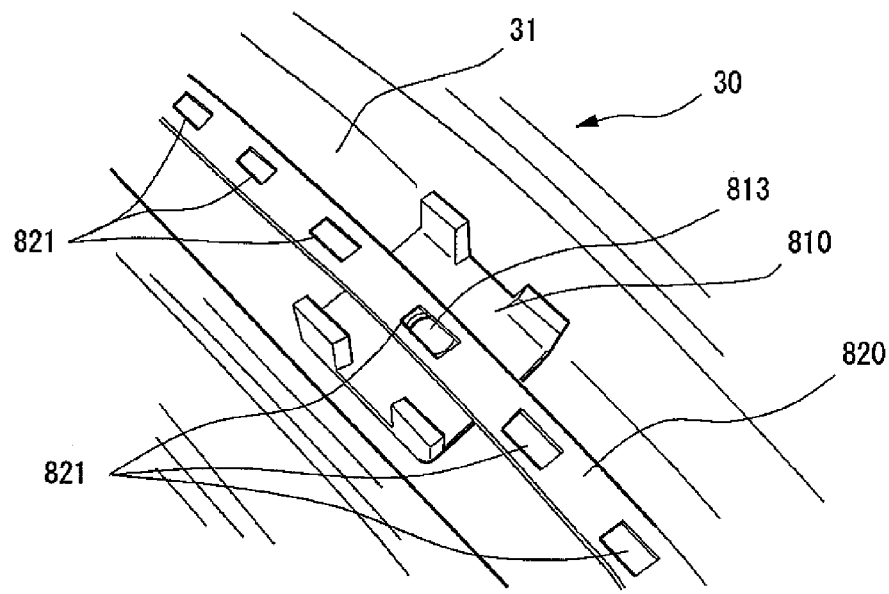
FIG. 11 is a view illustrating an example of mounting the sensor unit onto the rim according to the first embodiment of the present invention.
Figure 12:
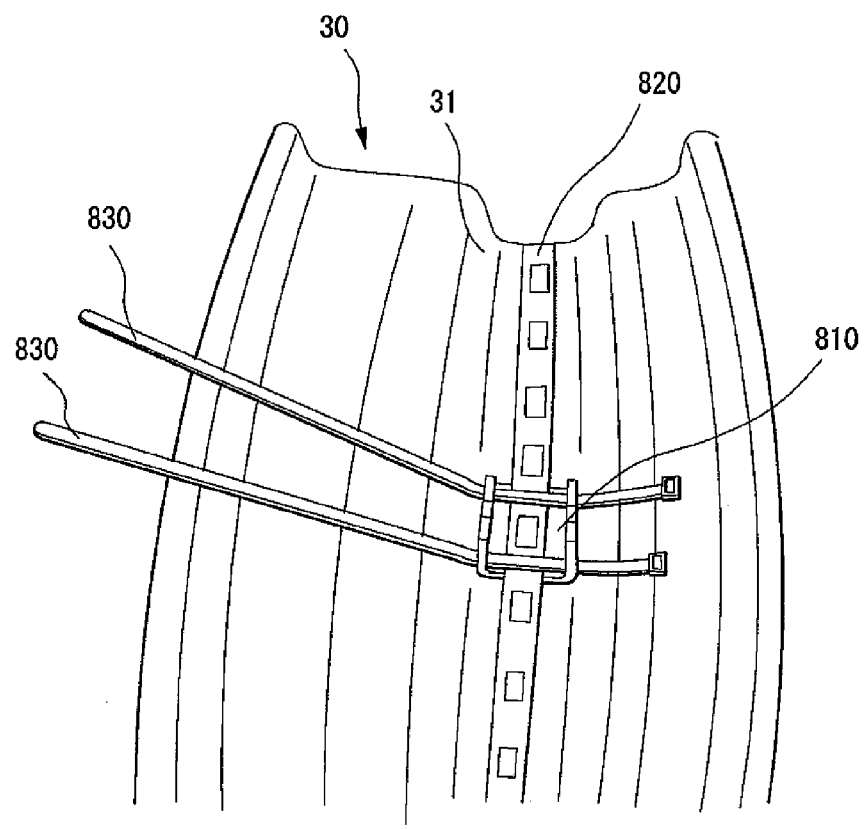
FIG. 12 is a view illustrating an example of mounting the sensor unit onto the rim according to the first embodiment of the present invention.
Figure 13:
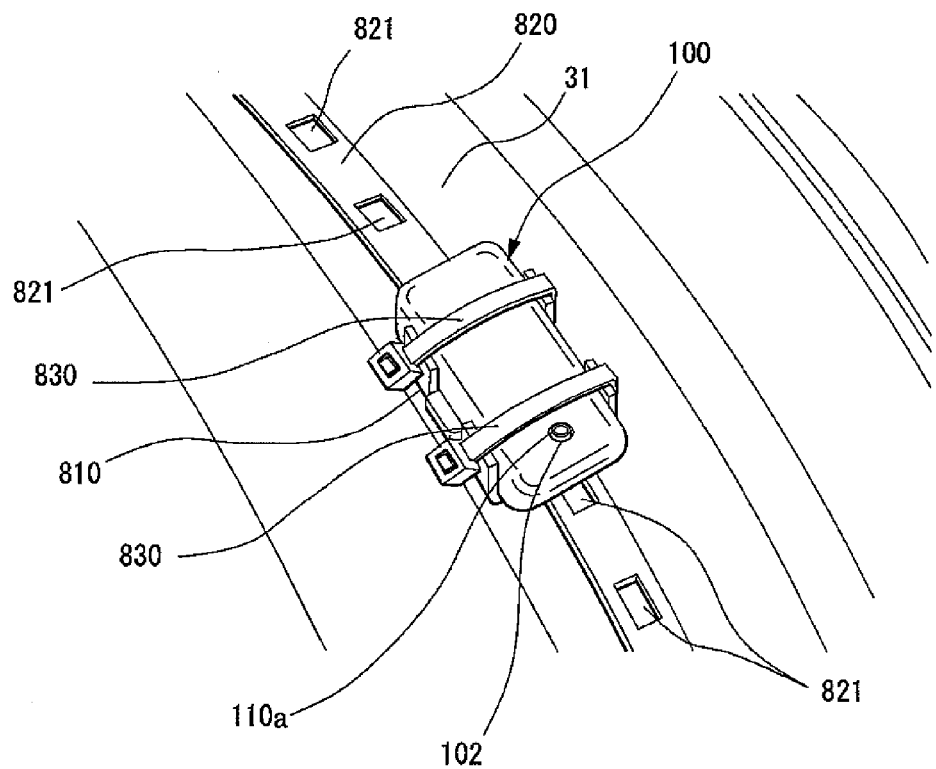
FIG. 13 is a view illustrating an example of mounting the sensor unit onto the rim according to the first embodiment of the present invention.
Figure 14:
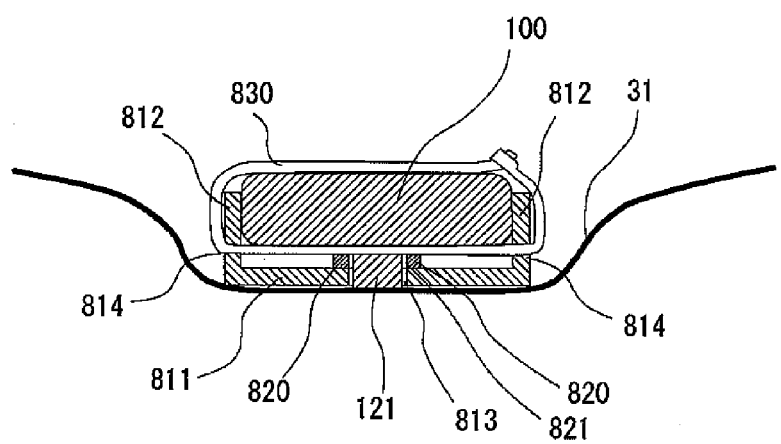
FIG. 14 is a view illustrating an example of mounting the sensor unit onto the rim according to the first embodiment of the present invention.

FIG. 1 is a view for explaining the overall configuration of a vehicle abnormality detection device according to a first embodiment of the present invention; FIG. 2 is a perspective view illustrating a vehicle brake mechanism section according to the first embodiment of the present invention; FIG. 3 is a side view illustrating the vehicle brake mechanism section according to the first embodiment of the present invention; and FIG. 4 is a block diagram of electrical circuit illustrating the vehicle abnormality detection device according to the first embodiment of the present invention.

In FIG. 1, reference numeral 2 denotes a tire, 100 denotes a sensor unit, and 200 denotes an abnormality detection unit. According to the present embodiment, in four sensor units 100, respective electrical circuits thereof are contained in a small housing having insulation quality and radio wave transparency. The four sensor units 100 are each attached to the tire 2 of the vehicle, and the abnormality detection unit 200 is arranged in the vicinity of the driver seat.

As illustrated in FIGS. 2 and 3, the tire 2 is a known tubeless radial tire, for example, and according to the present embodiment, includes a wheel and a rim. The tire 2 is constituted of a tire body 21 and the wheel 30 including the rim 31.

According to the present embodiment, as illustrated in FIG. 3, the tire 2 is provided with the sensor unit 100; the sensor unit 100 is secured to the rim 31. A method of mounting the sensor unit 100 onto the rim 31 will be described later.

In FIGS. 1 to 3, reference numeral 2 denotes the tire 2; 3 an axle; 100 the sensor unit; 200 a monitoring device; 410 an engine; 411 an accelerator pedal; 412 a sub throttle actuator; 413 a main throttle position sensor; 414 a sub throttle position sensor; 421 a steering wheel; 422 a rudder angle sensor; 510 and 520 a sensor sensing a tire rotation number; 610 a brake pedal; 620 a brake-use master cylinder; 630 a pressure control valve controlling brake-use oil pressure; 640 a brake drive actuator; 700 a stability control unit; 40 a drum brake mechanism section; 41 a brake drum; 42 a brake shoe; 43 a wheel cylinder; 44 a back plate; 50 a bearing mechanism section; 61 a lower arm; 62 a damper; 63 a transverse yoke; 64 a knuckle.

The stability control unit 700 is constituted of a control circuit provided with a known CPU, and captures sensing results outputted from the sensors 510 and 520 sensing a rotation number of each tire 2 mounted in the vehicle, and sensing results outputted from the throttle position sensors 413 and 414, the rudder angle sensor 422 and the monitoring device 200, and thereby performs stability control.

More specifically, at the time of acceleration, the accelerator pedal 411 is pushed down to open the main throttle, whereby fuel is sent into the engine 410 to increase the rotation number of the engine 410.

At the time of braking, the brake pedal 610 is pushed down to increase oil pressure within the master cylinder 620, and this oil pressure is transmitted via the pressure control valve to the brake drive actuator 640 of each tire 2, whereby the wheel cylinder 43 is driven to open the brake shoe 42, and braking force is applied to rotation of each tire 2.

The stability control unit 700 electrically controls the operating state of the sub throttle actuator 412 based on sensing results outputted from the sensor 510 and 520 sensing a rotation number of each tire 2, a sensing result of the rudder angle sensor 422, and a sensing result outputted from the monitor device 200 and electrically controls the operating state of each pressure control valve 630 and thereby controls the drive of the brake drive actuator 640 to hold vehicle stability and to perform automatic control to prevent the tire 2 from being locked, which may cause the wheel to skid.

The drum brake mechanism section 40 is similar to that of the conventional example described above and is arranged in the interior of the wheel 30 so as to be covered with the wheel 30. The back plate 44 is secured to the bearing mechanism section 50; the brake drum 41 is secured to the axle 30 along with the wheel 30.

The sensor unit 100 is secured, as described above, to a predetermined position of the rim 31 in the interior of the air chamber 22. By use of a pressure sensing element and a temperature sensing element described later arranged in the sensor unit 100, a pressure and temperature within the air chamber 22 of each tire 2 and a temperature of the rim 31 are sensed, and the sensing result is converted into a digital value. Also, the sensor unit 100 generates and transmits digital information containing these digital values. The digital information contains identification information unique to each sensor unit 100 in addition to the digital values of the sensing results.

As a specific example of electrical circuit of the sensor unit 100 and the abnormality detection unit 200, there can be listed a circuit illustrated in FIG. 4. More specifically, in the specific example illustrated in FIG. 4, the sensor unit 100 is constituted of a sensor module 110 having a pressure sensing element 111 and a first temperature sensing element 112, a second temperature sensing element 120, a control IC 130, a setting-use coil antenna 140, a transmitting IC 150, a battery 160 and a transmitting antenna 170.

The pressure sensing element 111 senses an air pressure within the tire air chamber 22 and outputs an analog electrical signal corresponding to the sensed air pressure.

The first temperature sensing element 112 senses a temperature within the tire air chamber 22 and outputs an analog electrical signal corresponding to the sensed temperature.

The second temperature sensing element 120 senses a temperature of the rim 31 and outputs an analog electrical signal corresponding to the sensed temperature.

The control IC 130 includes a known CPU 131, a memory circuit 132 and analog/digital (hereinafter referred to as A/D) converter circuits 133 to 135.

The CPU 131 operates based on programs stored in the memory circuit 132 and based on a setting signal by radio wave of a predetermined frequency (125 KHz, for example) received from the outside via the setting-use coil antenna 140, stores information including identification information and transmitting information format into the memory circuit 132 and converts into a digital signal, analog signals of the sensing results outputted from each of the pressure sensing element 111 and the first and second temperature sensing elements 112 and 120 via the A/D converter circuits 133 to 135 to capture the sensing results as a digital value. Then the CPU 131 transmits via the transmitting circuit 151a signal containing these sensing results and the identification information from the transmitting antenna 170 by use of radio wave of a predetermined frequency (315 MHz, for example). This transmitting processing is performed at a given time interval, for example every 10 minutes. When transmitting is intermittently performed in this manner, battery drain can be suppressed.

The memory circuit 132 is constituted of a known RAM, ROM, EEPROM and the like. In the EEPROM, there is preliminarily stored identification information of the sensor unit 100 mounted in each tire 2, the identification information being associated with the mounting location ($F_R$, $F_L$, $R_R$, $R_L$) of the tire 2. Also, electric power is supplied from the battery 160 to each constituent part of the sensor unit 100.

The abnormality detection unit 200 includes a receiving antenna 201, a receiving circuit 202, a control unit 205 containing a CPU 203 and a memory circuit 204, a display unit 206 and a power source unit 207 supplying electric power to each unit.

The receiving circuit 202 receives the radio wave transmitted from the sensor unit 100 via the receiving antenna 201 and acquires the sensing result information and identification information of the sensor unit 100 and outputs these pieces of information to the CPU 203.

The CPU 203 operates based on programs stored in the memory circuit 204. Based on an instruction signal transmitted from a setting-use device (not illustrated), the identification information of the sensor unit 100 mounted in each tire 2 is stored in the memory circuit 204, the identification information being associated with the tire location. The memory circuit 204 is constituted of a known RAM, ROM, EEPROM and the like.

Further, the CPU 203 associates with each tire 2, the sensing results received from the sensor unit 100, i.e., an air pressure value within tire air chamber, a temperature value (hereinafter referred to as a first temperature T1) within tire air chamber and a temperature value (hereinafter referred to as a second temperature T2) of the rim 31 and displays the values on a display (not illustrated) of the display unit 206. Further, the CPU 203 calculates a value of difference ΔT (=T2−T1) between the first temperature T1 and second temperature T2 and upon the difference value ΔT being a predetermined threshold value or more, displays an alarm associated with the tire 2.

According to the present embodiment, when the difference value ΔT is 50° C. or more, it is determined that an abnormality has occurred, and an alarm is displayed. Such abnormal state corresponds to a state in which the temperature of the rim 31 is abnormally higher than that of the normal state, for example to a case where because of maladjustment of the adjuster in the drum brake mechanism section 40, even when the brake is not activated, the brake shoe 42 is opened due to self servo effect that the drum brake mechanism section 40 has in principle, and contacts with the brake drum 41, thus generating frictional heat to result in a high temperature, or to a case where when grease filling amount or pressurization in bearings used in the bearing mechanism section 50 is erroneously applied, frictional resistance associated with rotation of the axle 3 increases, thus raising the temperature.

In this manner, heat generated in the drum brake mechanism section 40 or bearing mechanism section 50 heats up metals constituting these sections. As a result, the temperature of the wheel 30 and rim 31 positioned near the metals constituting these sections rises. Accordingly, when the temperature of the wheel 30 and rim 31 is monitored, an abnormal temperature rise in the drum brake mechanism section 40 or bearing mechanism section 50 can be detected.

The temperature of the wheel 30 and rim 31 is also raised by heating ascribable to frictional resistance between the tire body 21 and road surface during running of the vehicle. Thus, according to the present embodiment, the temperature rise caused by the heating ascribable to frictional resistance between the tire body 21 and road surface is monitored through air temperature (first temperature T1) within the tire air chamber 22, and the temperature difference ΔT is calculated as described above, whereby correction is made to prevent an abnormality state from being erroneously detected.

As described above, according to the present embodiment, the increase of frictional resistance caused by maladjustment of the drum brake mechanism section 40 or maladjustment of the bearing mechanism section 50 and heating associated therewith can be early discovered; thus, low mileage during running of the vehicle, or fire or burst of the tire can be prevented from occurring.

The configuration of the sensor unit 100 described above and the method of mounting it onto the rim 31 will now be described in detail.

FIGS. 5 to 8 are each a configuration diagram illustrating a specific example of the sensor unit 100; FIGS. 9 to 14 are each a view illustrating an example of mounting the sensor unit 100 onto the rim 31. As illustrated in the drawings, the sensor unit 100 is constituted of electronic components mounted on a printed circuit board 103 contained in the interior of a housing 101 composed of housing members 101a and 101b made of, for example, resin.

On the face of the printed circuit board 103, there are mounted a sensor module 110 having a sensing-use protrusion 110a, a control IC 130, a setting-use coil antenna 140, a transmitting IC 150, a battery 160 and a transmitting antenna 170; on the center of the back of the board, there is mounted a second temperature sensing element 120 having a sensing-use protrusion 121.

The printed circuit board 103 having the electronic components mounted as described above is contained in the housing 101. Here, in one housing member 101a acting as a lid body facing the face of the printed circuit board 103, there is formed an opening 102 through which the sensing-use protrusion 110a of the sensor module 110 penetrates; in the vicinity of the center of the other housing member 101b acting as a bottom body facing the back of the printed circuit board 103, there is formed an opening 104 through which the sensing-use protrusion 121 of the second temperature sensing element 120 penetrates. Further, in the center of both sides of the housing member 101b, there are arranged protrusions 105a and 105b having a flat plate shape extending in a direction orthogonal to the side face.

Here, the sensing-use protrusion 110a of the sensor module 110 is cylindrical and arranged so that the pressure sensing element 111 and first temperature sensing element 112 in the sensor module can touch air within the tire air chamber 22. The sensing-use protrusion 121 of the second temperature sensing element 120 is constituted of a member having heat conductance and arranged so as to transfer heat to the temperature sensor of the second temperature sensing element 120.

Further, while the printed circuit board 103 is contained in the housing 101, the sensing-use protrusion 121 of the second temperature sensing element 120 penetrates through the opening 104, and its tip end protrudes a predetermined length from the surface of the housing member 101b.

According to the present embodiment, when the sensor unit 100 is secured to the rim 31, a pedestal 810 and a stainless band 820 are used as illustrated in FIGS. 9 to 14.

The pedestal 810 is made of resin or the like (for example, 66 nylon, epoxy, ABS) having a relatively low heat conductance and not causing the lowering of stress at a temperature of about 120° C. and constituted of: a bottom plate 811 having arranged in the center thereof an opening 813 into which the sensing-use protrusion 121 of the second temperature sensing element 120 can be inserted; and a support 812 having a flat plate shape provided at four corners of the bottom plate 811. In the bottom plate 811 side of the support 812, there is arranged a through hole 814 into which a heat-resisting tie wrap 830 can be inserted.

The sensor unit 100 is mounted in the pedestal 810 so that the sensing-use protrusion 121 of the second temperature sensing element 120 penetrates through the opening 813 of the pedestal 810 and also, the protrusions 105a and 105b existing in both sides thereof are sandwiched by the support 812. The pedestal 810 is secured to the rim 31 by the stainless band 820 forming a circle around the wheel 30 to surround the surface of the rim 31. The stainless band 820 has formed therein openings 821 disposed at the same interval, and one of the openings is disposed so as to overlap the opening 813 existing in the bottom plate 811 of the pedestal 810.

The sensor unit 100 is secured to the pedestal 810 fastened to the rim 31 in this manner by use of the stainless band 820. In securing the sensor unit 100 to the pedestal 810, the heat-resisting tie wrap 830 inserted into the through hole 814 of the support 812 is used. While the sensor unit 100 is secured to the pedestal 810, the sensing-use protrusion 121 of the second temperature sensing element 120 of the sensor unit 100 penetrates through the opening 813 of the pedestal 810 and the opening 821 of the stainless band 820, and the tip end of the sensing-use protrusion 121 makes contact with the surface of the rim 31. Accordingly, heat of the rim 31 is transferred to the second temperature sensing element 120 via the sensing-use protrusion 121.

Also, while the sensor unit 100 is secured to the pedestal 810, the sensing-use protrusion 110a of the sensor module 110 is positioned in the tire air chamber 22 side via the opening 102 of the housing 101. Therefore, the pressure sensing element 111 in the sensor module 110 can sense an air pressure within the tire air chamber 22 and also, the first temperature sensing element 112 can sense an air temperature within the tire air chamber 22.

Measurement values of air temperature within the tire air chamber 22 and of temperature of the rim 31 sensed by the abnormality detection device described above will now be described with reference to FIGS. 15 and 16.

Figure 15:
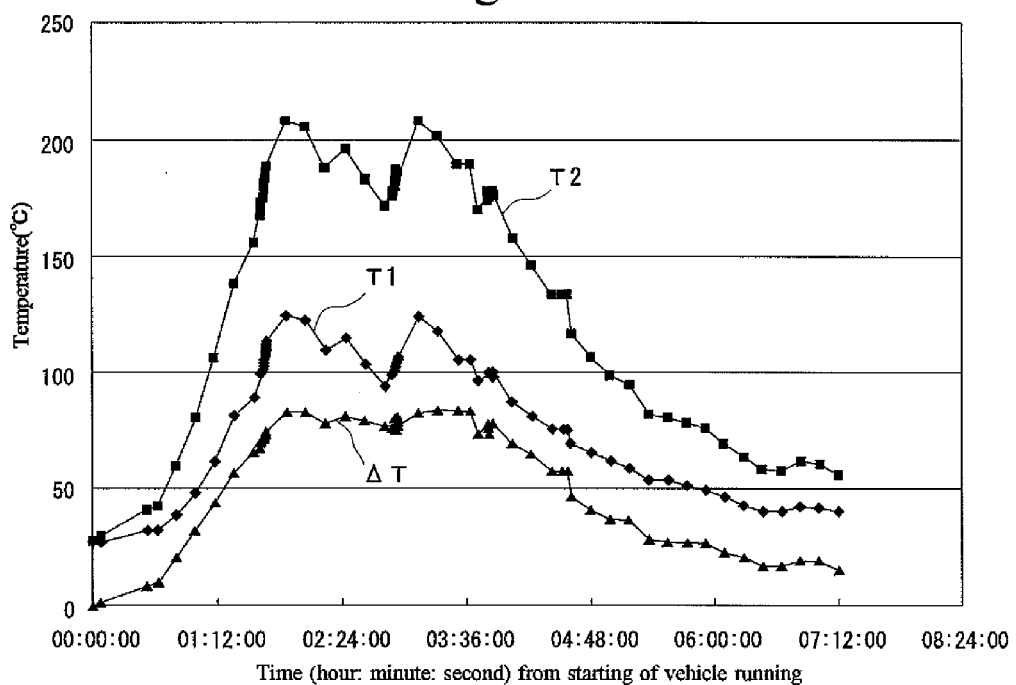
FIG. 15 is a view illustrating temperature measurement values when maladjustment is made to the brake mechanism section according to the first embodiment of the present invention.

FIG. 15 is a view illustrating air temperature (first temperature T1) within the tire air chamber 22, temperature (second temperature T2) of the rim 31 and temperature difference therebetween ($\Delta T$) when, because of maladjustment of the adjuster in the drum brake mechanism section 40, running continues with the brake shoe 42 contacting the brake drum 41. FIG. 16 is a view illustrating air temperature (first temperature T1) within the tire air chamber 22, temperature (second temperature T2) of the rim 31 and temperature difference therebetween ($\Delta T$) when, adjustment is normally made to the adjuster of the drum brake mechanism section 40.

Figure 16:
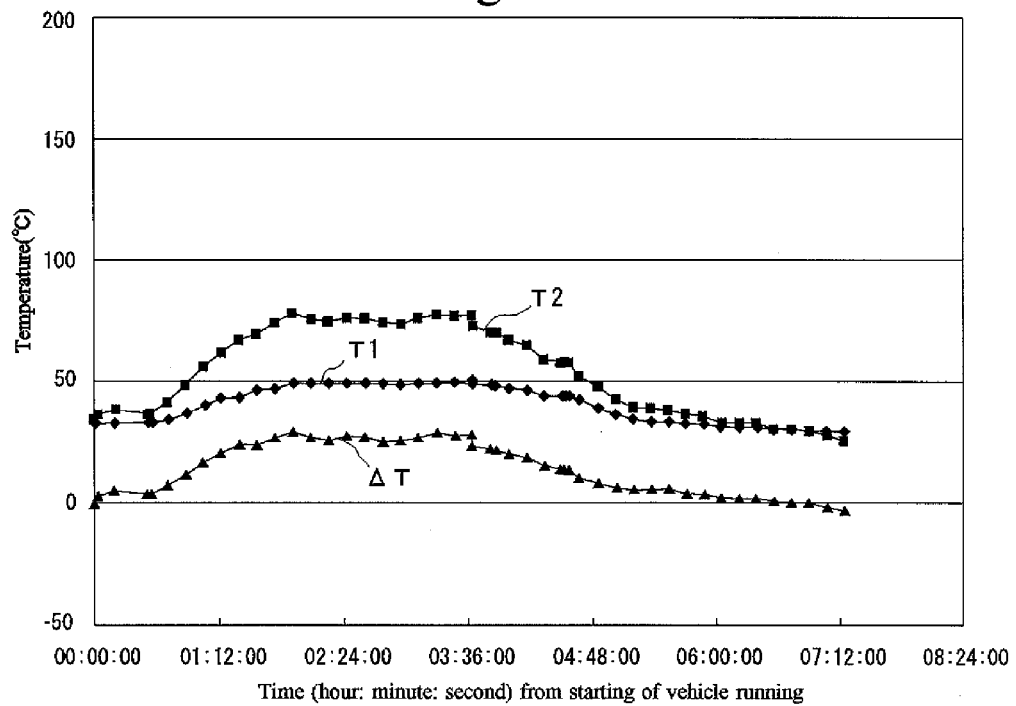
FIG. 16 is a view illustrating temperature measurement values when adjustment is normally made to the brake mechanism section according to the first embodiment of the present invention.

In FIGS. 15 and 16, the ordinate represents temperature (° C.) and the abscissa represents a length of time (hour: minute: second) from the starting of vehicle running to several hours after the stopping of running.

When maladjustment is made to the adjuster of the brake mechanism section 40, as illustrated in FIG. 15, both the first temperature T1 and second temperature T2 shapely rise starting just after running starts, and the peak value of the second temperature T2 reaches 210° C.; at this time, the first temperature T1 is about 130° C. and the temperature difference therebetween is about 80° C. It is thought that the temperature rise at this time is ascribable to frictional heat produced between the brake shoe 42 and brake drum 41 in addition to frictional heat produced between the tire body 21 and road surface.

Meanwhile, when adjustment is normally made to the adjuster of the brake mechanism section 40, as illustrated in FIG. 16, both the first temperature T1 and second temperature T2 gradually rise starting just after running starts; the peak value of the second temperature T2 is about 75° C. and the first temperature T1 at this time is about 50° C., and the temperature difference therebetween is about 25° C. It is thought that the temperature rise at this time is ascribable to frictional heat produced between the tire body 21 and road surface.

Given these measurement values, according to the present embodiment, when the temperature difference $\Delta T$ is 50° C. (threshold temperature) or more, an alarm is raised to prevent burst or fire of the tire 2 from occurring. The value of this threshold temperature $\Delta T$ is preferably appropriately set according to a difference in vehicle, brake structure or the like.

The above measurement values are related to adjustment of the adjuster of the brake mechanism section 40. However, similar detection is also possible with respect to maladjustment of the bearing mechanism section 50.

It is to be understood that even if adjustment is normally made to the adjuster of the brake mechanism section 40, when the brake is applied for a long time during running on a downslope or the like, the temperature difference $\Delta T$ may be 50° C. or more. In such case, a false alarm is raised by applying the brake. In order to prevent such false alarm from being raised, the abnormality detection processing may be stopped at the time of applying the brake and also for a predetermined time period after applying the brake, for example for 10 to 30 minutes. A signal indicating the applying of the brake can be supplied by arranging a sensor in the brake pedal 610, or supplied from the stability control unit 700; the time period from when the brake is applied to when the detection processing is initiated can be set by a timer or the like.

Also, when a receiving antenna or receiver connected to the abnormality detection unit 200 is provided for each tire 2 and disposed at a position close to the tire 2, such as in the tire house, transmission power of the sensor unit 100 can be reduced to suppress battery drain.

Also, according to the present embodiment, a signal containing sensing results are transmitted from the sensor unit 100 to the abnormality detection unit 200 by use of radio wave, but each sensor unit 100 and the abnormality detection unit 200 may be connected by a cable using a slip ring to transmit the signal containing the sensing results from the sensor unit 100 to the abnormality detection unit 200.

Figure 17:
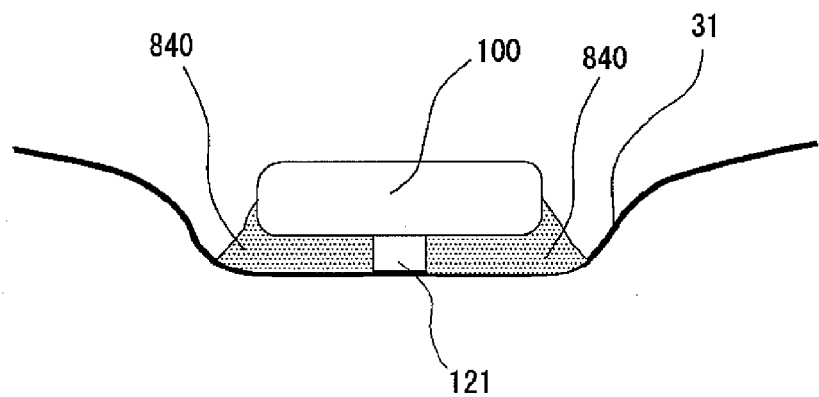
FIG. 17 is a view for explaining another method for securing the sensor unit according to the first embodiment of the present invention.

Also, in securing the sensor unit 100 to the rim 31, as illustrated in FIG. 17, without using the pedestal 810 and the stainless band 820, arrangement may be made such that the tip end of the sensing-use protrusion 121 of the second temperature sensing element 120 abuts against the surface of the rim 31 and the fixation is made using an adhesive such as polyurethane adhesive 840.

Figure 18:
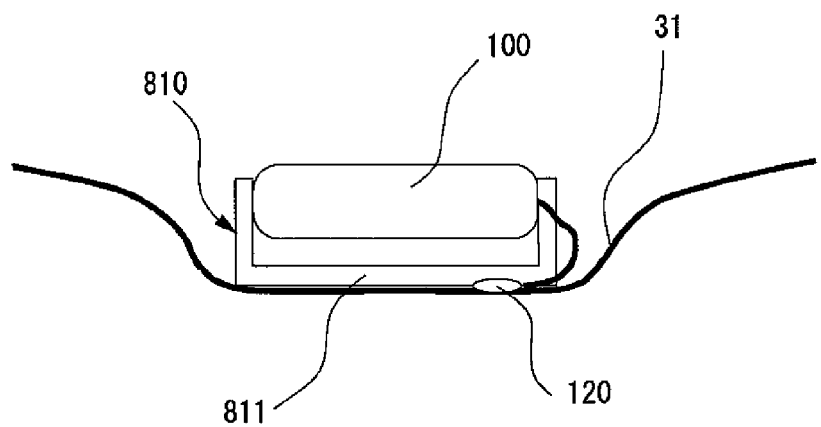
FIG. 18 is a view for explaining another method for securing the sensor unit according to the first embodiment of the present invention.

Also, as illustrated in FIG. 18, the second temperature sensing element 120 may be exposed outside the housing 101 of the sensor unit 100 to make contact with the rim 31.

Also, according to the present embodiment, abnormal heating of the brake mechanism section 40 and the bearing mechanism section 50 is detected by use of temperature (second temperature T2) of the rim 31, but the present invention is not limited to the temperature of the rim 31; there may be sensed a temperature of a constituent part which noticeably rises in association with heating of the brake mechanism section 40 and the bearing mechanism section 50 to detect abnormal heating of the brake mechanism section 40 and the bearing mechanism section 50.

Also, according to the present embodiment, in detecting abnormal heating of the brake mechanism section 40 and the bearing mechanism section 50, correction is made using air temperature within the tire air chamber 22. Instead, temperature of the tire body 21 may be used to make the correction.

A second embodiment of the present invention will now be described.

The device configuration according to the second embodiment is approximately similar to that of the first embodiment described above. The difference lies in that according to the second embodiment, when first temperature T1 reaches a predetermined threshold temperature Tth1 or more, an alarm is raised and also, when second temperature T2 is a predetermined threshold temperature Tth2 or more, an alarm is raised.

According to the present embodiment, the threshold temperature Tth1 is set to, for example, 150° C. and an alarm is raised before the first temperature T1 reaches solder melting temperature in the printed circuit board 103 or the like. Also, the threshold temperature Tth2 is set to, for example, 100° C. and an alarm is raised before fire occurs.

A third embodiment of the present invention will now be described.

Figure 19:
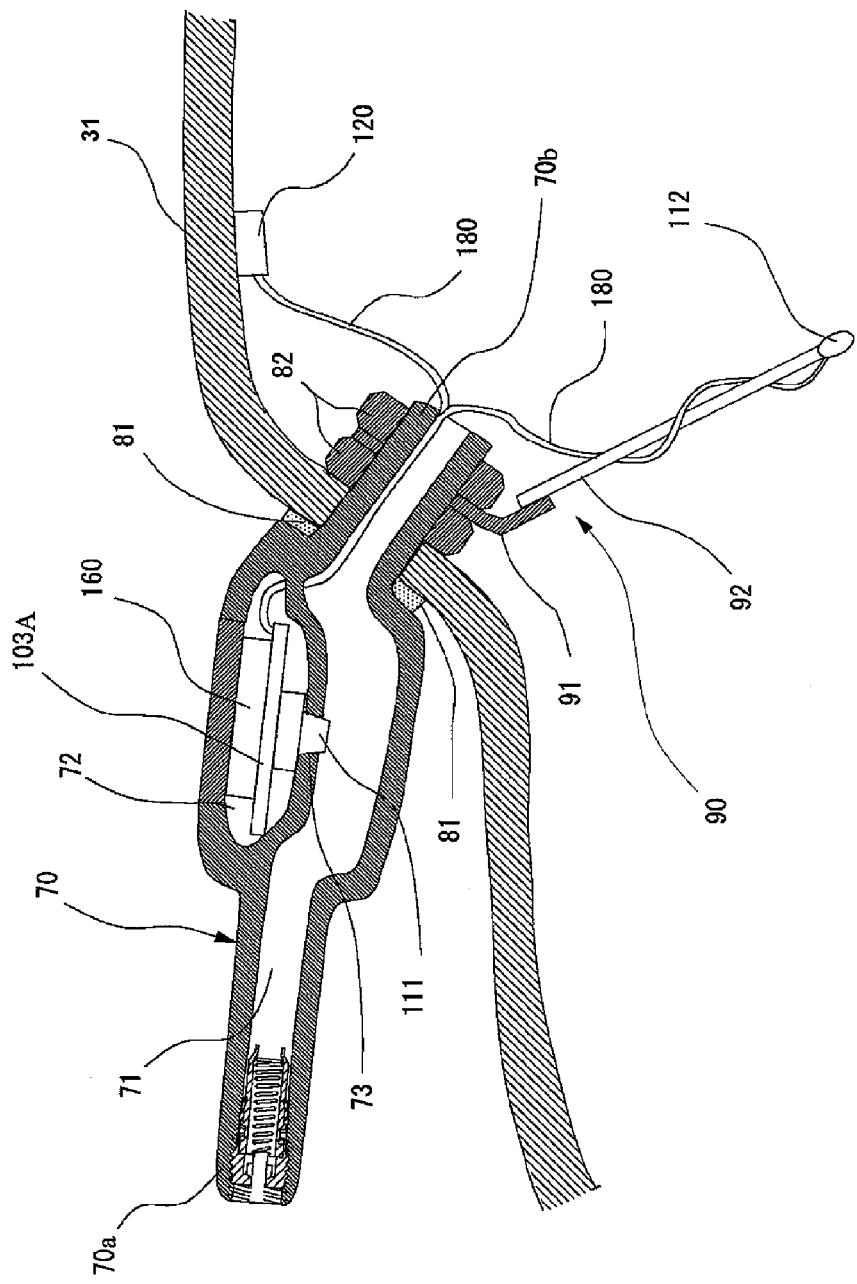
FIG. 19 is a cross-sectional view illustrating a valve stem according to a third embodiment of the present invention.

FIG. 19 is a cross-sectional view illustrating a valve stem according to the third embodiment of the present invention. According to the present embodiment, a valve stem formed integrally with a sensor unit is constructed. More specifically, the valve stem 70 of the present embodiment has a chamber 71 and an isolated chamber 72 adjacent to the chamber 71; in the interior of the isolated chamber 72, there is contained a unit body including a printed circuit board 103A having disposed therein electric components and a battery 160; a pressure sensing element 111 is fit and glued to a through hole 73 arranged in a dividing wall between the chamber 71 and the isolated chamber 72 in such a manner that air leakage does not occur.

In one end of the chamber 71 of the valve stem 70, similarly to an ordinary valve stem, there is arranged a valve core 70a; the other end of the valve stem 70 is inserted into a through hole of the rim 31 in such a manner that air leakage is prevented by use of a gasket 81; the valve stem 70 is secured to the rim 31 by use of two nuts 82.

Also, between the two nuts 82, there are inserted a washer 91 having mounted thereon a mast 92 of a predetermined length; at the tip end of the mast 92 arranged so as to extend to the interior of the tire air chamber, there is mounted a first temperature sensing element 112. Further, a second temperature sensing element 120 abuts against the rim 31 and is fixed thereto. The first temperature sensing element 112 and second temperature sensing element 120 are each connected to the printed circuit board 103A via a pair of wires (electric wire) extracted from the isolated chamber 72 through the chamber 71.

With the above configuration, an air temperature within the tire air chamber can be sensed by the first temperature sensing element 112; a temperature of the rim 31 can be sensed by the second temperature sensing element 120.

Also, since the unit body is formed integrally with the valve stem 70, the unit body can be easily installed by mounting the valve stem 70. Further, since the wire (electric wire) connecting the unit body with the first temperature sensing element 112 and the second temperature sensing element 120 is installed through an opening of the valve stem 70, additional wiring route need not be arranged.

A fourth embodiment of the present invention will now be described.

Figure 20:
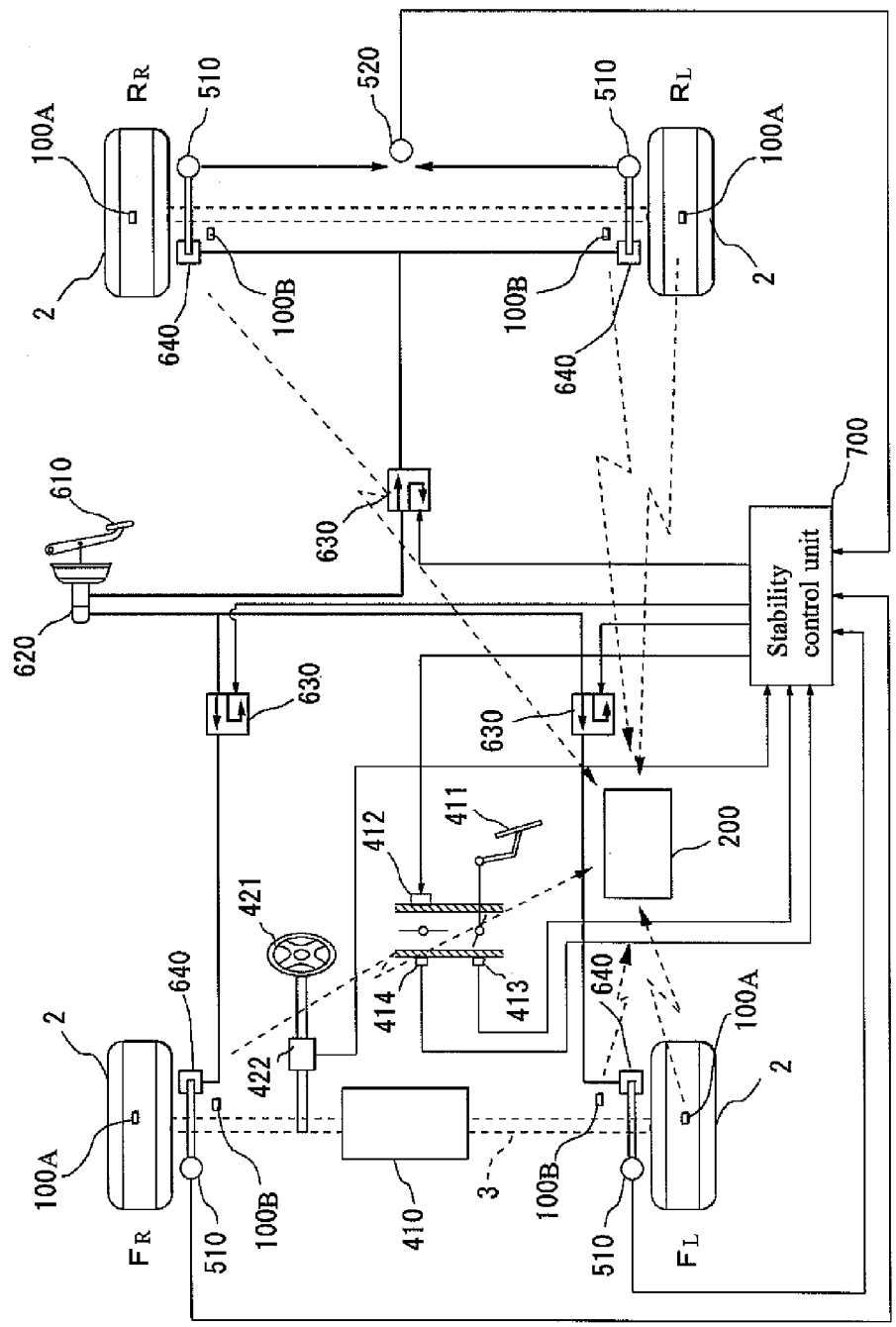
FIG. 20 is a view for explaining the overall configuration of a vehicle abnormality detection device according to a fourth embodiment of the present invention.
Figure 21:
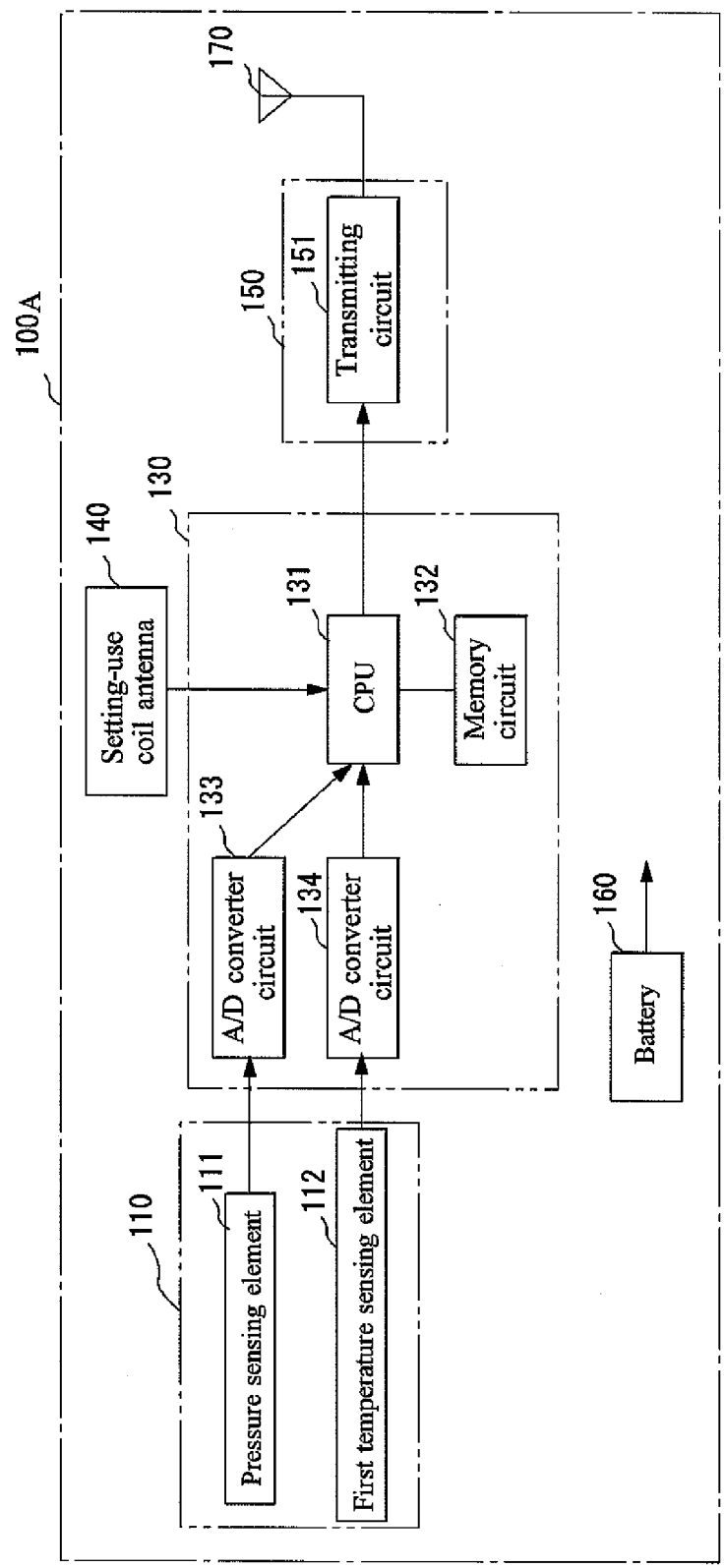
FIG. 21 is a block diagram illustrating an electrical circuit of a first sensor unit according to the fourth embodiment of the present invention.
Figure 22:
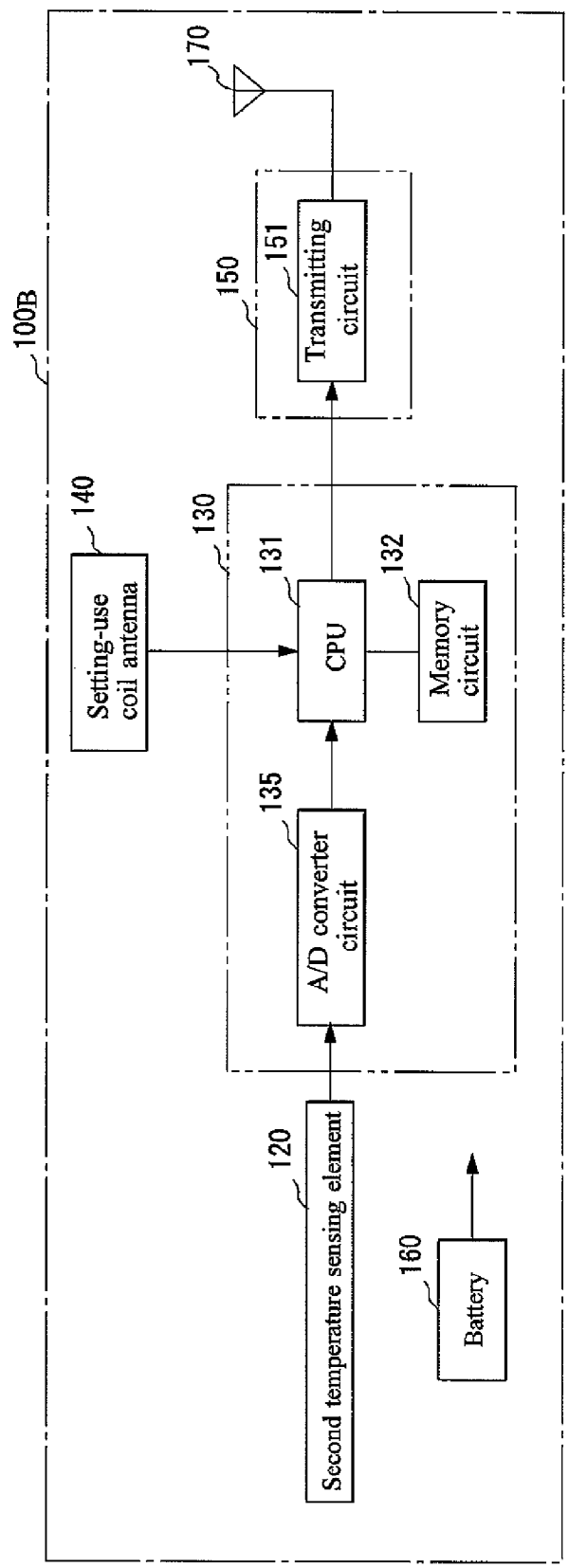
FIG. 22 is a block diagram illustrating an electrical circuit of a second sensor unit according to the fourth embodiment of the present invention.
Figure 23:
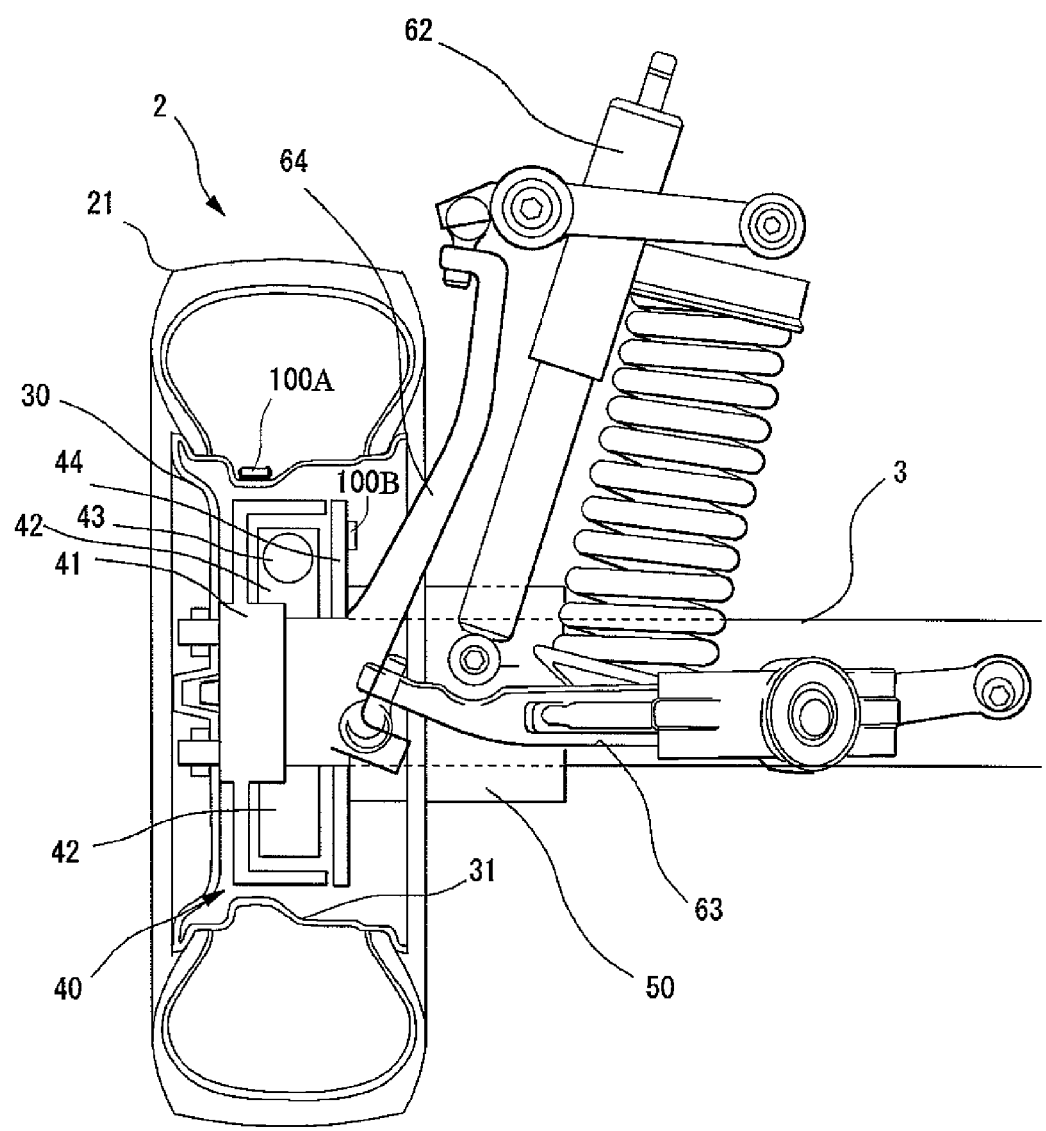
FIG. 23 is a view for explaining the location of placement of the first and second sensor units according to the fourth embodiment of the present invention.

FIG. 20 is a view for explaining the overall configuration of a vehicle abnormality detection device according to the fourth embodiment of the present invention; FIG. 21 is a block diagram illustrating an electrical circuit of a first sensor unit according to the fourth embodiment of the present invention; FIG. 22 is a block diagram illustrating an electrical circuit of a second sensor unit according to the fourth embodiment of the present invention; FIG. 23 is a view for explaining the location of placement of the first and second sensor units according to the fourth embodiment of the present invention. In these drawings, the same reference numerals are applied to constituent parts corresponding to the first embodiment described above, and an explanation thereof is omitted. The difference between the fourth embodiment and the first embodiment lies in that according to the fourth embodiment, instead of the sensor unit 100 of the first embodiment, there are provided a first sensor unit 100A sensing an temperature and air pressure within the tire air chamber 22 and a second sensor unit 100B sensing a temperature of the drum brake mechanism section 40.

Similarly to the first embodiment, the first sensor unit 100A is secured to a predetermined position in the rim 31 within the air chamber 22 of the tire 2; a pressure and temperature within the air chamber 22 of each tire 2 are sensed by a pressure sensing element and a temperature sensing element described later, and the sensing results are converted into a digital value and transmitted to the abnormality detection unit 200 along with identification information.

The first sensor unit 100A is constituted of a sensor module 110 having a pressure sensing element 111 and a first temperature sensing element 112, and a control IC 130, a setting-use coil antenna 140, a transmitting IC 150, a battery 160 and a transmitting antenna 170.

The CPU 131 operates based on programs stored in a memory circuit 132 and based on a setting signal by radio wave of a predetermined frequency (125 KHz, for example) received from the outside via the setting-use coil antenna 140, stores information including identification information and transmitting information format into the memory circuit 132 and converts into a digital signal, analog signals of the sensing results outputted from each of the pressure sensing element 111 and the first temperature sensing element 112 via A/D converter circuits 133 and 134 to capture the sensing results as a digital value. Then the CPU 131 transmits via a transmitting circuit 151 a signal containing these sensing results and the identification information from the transmitting antenna 170 by use of radio wave of a predetermined frequency (315 MHz, for example). This transmitting processing is performed at a given time interval, for example every 10 minutes. When transmitting is intermittently performed in this manner, battery drain can be suppressed.

The second sensor unit 100B is secured to a predetermined position in a back plate 44. A temperature of each drum brake mechanism section 40 is sensed by a temperature detection element 120 arranged in the second sensor unit 100B. The sensing results are converted into a digital value and transmitted to the abnormality detection unit 200 along with identification information.

The second sensor unit 100E is constituted of a second temperature sensing element 120, a control IC 130, a setting-use coil antenna 140, a transmitting IC 150, a battery 160 and a transmitting antenna 170.

The CPU 131 operates based on programs stored in a memory circuit 132 and based on a setting signal by radio wave of a predetermined frequency (125 KHz, for example) received from the outside via the setting-use coil antenna 140, stores information including identification information and transmitting information format into the memory circuit 132 and converts into a digital signal an analog signal of the sensing result outputted from the second temperature sensing element 120 via an A/D converter circuit 135 to capture the sensing result as a digital value. Then the CPU 131 transmits via a transmitting circuit 151 a signal containing the sensing result and the identification information from the transmitting antenna 170 by use of radio wave of a predetermined frequency (315 MHz, for example). This transmitting processing is performed at a given time interval, for example every 10 minutes. When transmitting is intermittently performed in this manner, battery drain can be suppressed.

When two sensor units 100A and 100B are provided in this manner, a temperature of the drum brake mechanism section 40 can be directly sensed by the second sensor unit 100B, whereby the effect similar to that of the first embodiment can be achieved. In this case, the temperature of the back plate 44 of the drum brake mechanism section rises due to heating of the drum brake mechanism section 40 itself, but also rises when heating of the adjacent bearing mechanism section 50 is transferred thereto. Accordingly, by sensing a temperature of the drum brake mechanism section 40, abnormal heating of both the drum brake mechanism section 40 and the bearing mechanism section 50 can be detected.

Figure 24:
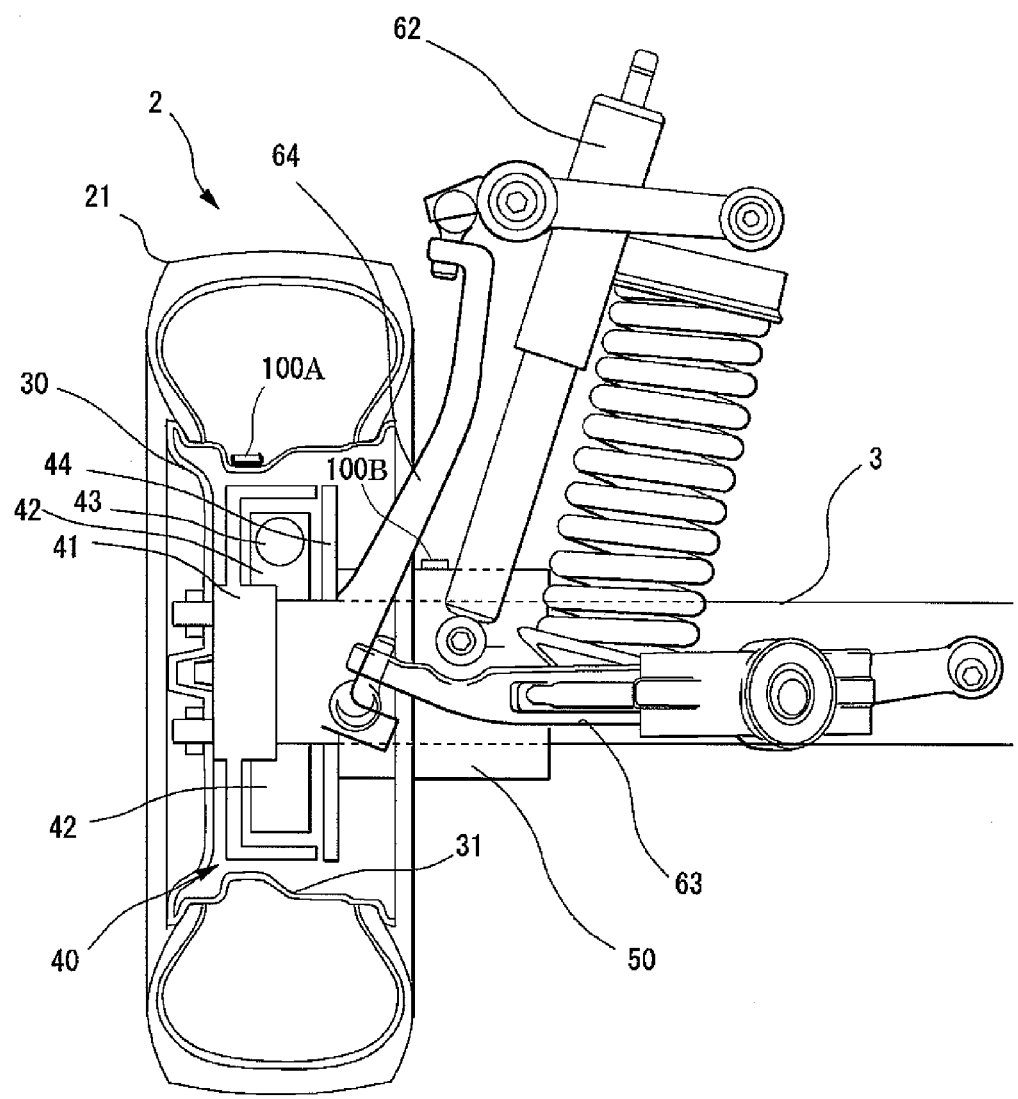
FIG. 24 is a view for explaining the location of placement of the first and second sensor units according to the fourth embodiment of the present invention.

It is to be understood that, as illustrated in FIG. 24, the second sensor unit 100B may be secured to a predetermined position in the bearing mechanism section 50 to thereby sense a temperature of the bearing mechanism section 50 by use of the second temperature sensing element 120, whereby abnormal heating of both the drum brake mechanism section 40 and the bearing mechanism section 50 can also be detected.

Consequently, according to the fourth embodiment, also, the increase of frictional resistance caused by maladjustment of the brake mechanism section 40 or maladjustment of the bearing mechanism section 50 and heating associated therewith can be early discovered; thus, low mileage during running of the vehicle, or fire or burst of the tire can be prevented from occurring.

Figure 25:
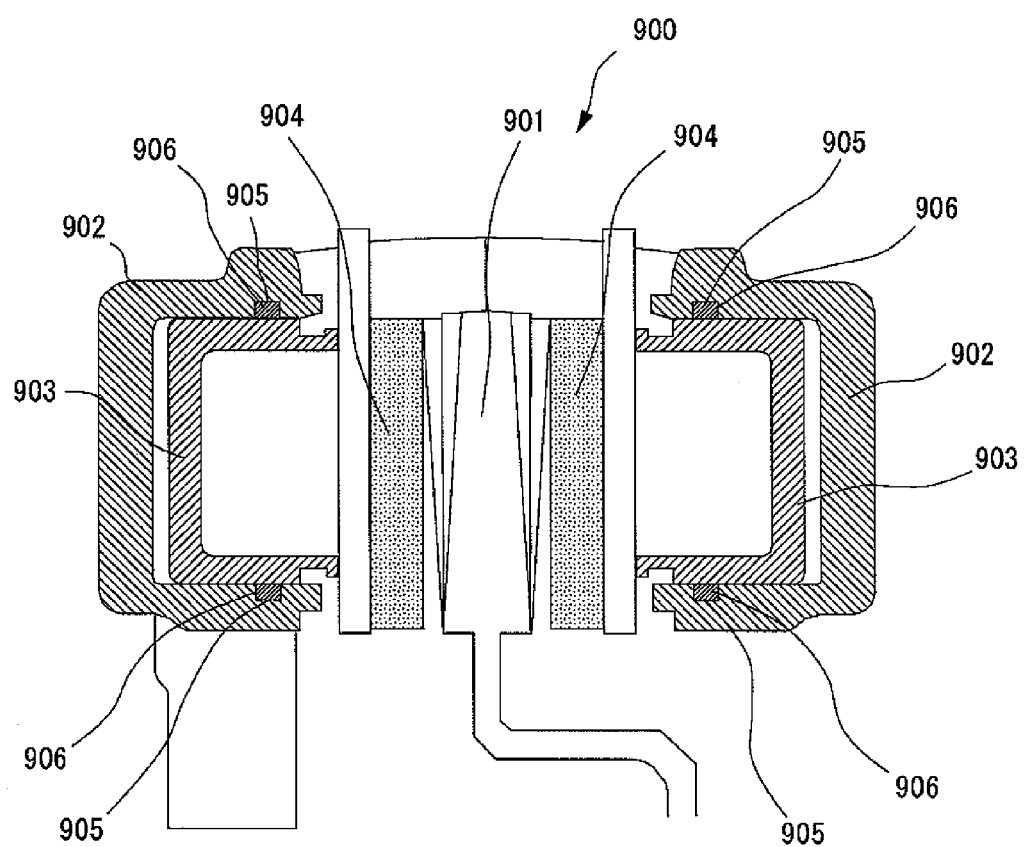
FIG. 25 is a cross-sectional view illustrating a disk brake according to another embodiment of the present invention.
Figure 26:
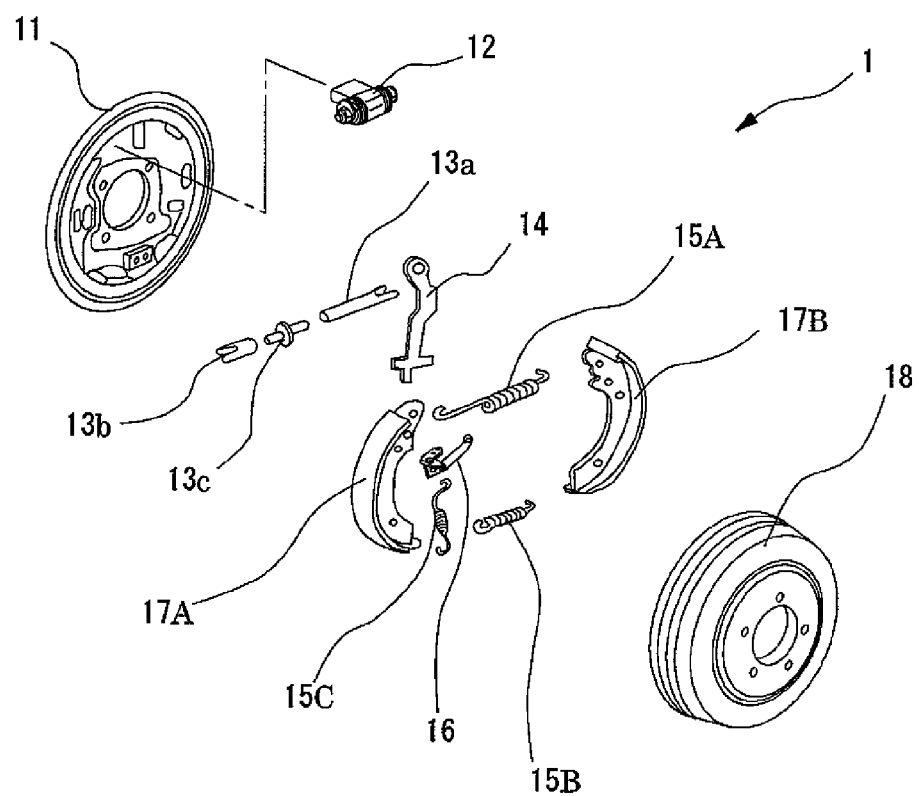
FIG. 26 is an exploded perspective view illustrating a conventional example of a drum brake.

Each of the embodiments described above is a merely exemplary of the present invention, and the present invention is not limited only to the configuration of the embodiments. For example, the present invention is also applicable to a case where a disk brake mechanism section is used, thus achieving the similar effect. FIG. 25 is a cross-sectional view illustrating a disk brake mechanism section 900. In FIG. 25, reference numeral 901 denotes a brake disk (hereinafter, simply referred to as a disk); 902 a caliper; 903 a piston; 904 a pad; 905 a seal groove formed in the caliper 902; 906 a piston seal fitted into the seal groove 905. In the case of the disk brake illustrated in FIG. 25, an operation of returning the piston 903 is performed to cause the pad 904 to distance it from the disk 901. In a state where the piston seal 906 is contaminated, when the pad 904 distances it from the disk 901, the temperature rises. Such temperature rise can also be sensed by applying the present invention. Accordingly, by sensing a temperature of the disk brake mechanism section 900, abnormal heating of both the disk brake mechanism section 900 and the bearing mechanism section can be detected.

INDUSTRIAL APPLICABILITY

Abnormality is detected based on a temperature ascribable to frictional heat generated in the vehicle bearing mechanism section or vehicle brake mechanism section due to maladjustment of the vehicle bearing mechanism section or vehicle brake mechanism section. Consequently, the increase of frictional resistance caused by maladjustment of the brake or maladjustment of the bearing mechanism section and heating associated therewith can be early discovered; thus, low mileage during running of the vehicle, or fire or burst of the tire can be prevented from occurring.

The invention claimed is:

1. A vehicle abnormality detection method for using a vehicle abnormality detection device to detect an abnormality of at least one of a vehicle bearing mechanism section and a vehicle brake mechanism section in a vehicle provided with a tire including a tire wheel and a tire body mounted in the tire wheel, the method characterized in that the abnormality detection device
    senses as a first temperature any one of an air temperature within tire and a tire body temperature by a first temperature sensing element inside a sensor unit housing,
    senses as a second temperature a temperature related to at least one of a temperature of the vehicle bearing mechanism section and a temperature of the vehicle brake mechanism section by a second temperature sensing element inside said sensor unit housing, characterized in that the second temperature sensing element is arranged to sense a temperature of the tire wheel as the second temperature,
    calculates a temperature difference between the first and second temperatures, and
    determines, upon the temperature difference being a predetermined value or more, that an abnormality has occurred in the vehicle bearing mechanism section or the vehicle brake mechanism section and thereby detects the abnormality.

2. The vehicle abnormality detection method according to claim 1, characterized in that the abnormality detection device senses as the first temperature an air temperature within tire.

3. The vehicle abnormality detection method according to claim 1, characterized in that the abnormality detection device detects braking of the vehicle and then stops the abnormality detection for a predetermined time period after detecting the vehicle braking.

4. The vehicle abnormality detection method according to claim 1, characterized in that the abnormality detection device raises an alarm to a driver when the abnormality is detected.

5. The vehicle abnormality detection method according to claim 1, characterized in that the abnormality detection device raises an alarm to the driver when one of the first and second temperatures reaches a respective predetermined threshold temperature preliminarily set or more.

6. a vehicle abnormality detection device detecting an abnormality of at least one of a vehicle bearing mechanism section or a vehicle brake mechanism section in a vehicle provided with a tire including a tire wheel and a tire body mounted in the tire wheel, the device characterized by comprising:

a sensor unit having a sensor housing and comprising in said housing:
  a first temperature sensing element sensing as a first temperature any one of an air temperature within tire and a tire body temperature;
  a second temperature sensing element sensing as a second temperature a temperature related to at least one of a temperature of the vehicle bearing mechanism section and a temperature of the vehicle brake mechanism section, characterized in that the second temperature sensing element is arranged to sense a temperature of tire wheel as the second temperature;
means for calculating a temperature difference between the first and second temperatures; and
means for determining, upon the temperature difference being a predetermined value or more, that an abnormality has occurred in the vehicle bearing mechanism section or the vehicle brake mechanism section and thereby detecting the abnormality.

7. The vehicle abnormality detection device according to claim 6, characterized in that the first temperature sensing element senses as the first temperature an air temperature within tire.

8. The vehicle abnormality detection device according to claim 6, characterized by further comprising:
  means for detecting braking of the vehicle; and
  means for stopping the abnormality detection for a predetermined time period after detecting the vehicle braking.

9. The vehicle abnormality detection device according to claim 6, characterized by further comprising means for raising an alarm to a driver when the abnormality is detected.

10. The vehicle abnormality detection device according to claim 6, characterized by further comprising means for raising an alarm to the driver when one of the first and second temperatures reaches a respective predetermined threshold temperature preliminarily set or more.

11. The vehicle abnormality detection device according to claim 6, comprising a sensor unit and an abnormality detection unit, the device characterized in that:
  the sensor unit has the first temperature sensing element, the second temperature sensing element and means for converting into a signal, information on first temperature sensed by the first temperature sensing element and information on second temperature sensed by the second temperature sensing element and for transmitting the signal; and
  the abnormality detection unit has means for receiving the signal transmitted from the sensor unit to obtain the information on first temperature and the information on second temperature from the received signal, means for calculating based on the obtained information a temperature difference between the first and second temperatures, and means for determining, upon the temperature difference being a predetermined value or more, that an abnormality has occurred in the vehicle bearing mechanism section or the vehicle brake mechanism section and thereby detecting the abnormality.

12. The vehicle abnormality detection device according to claim 6, comprising a sensor unit and an abnormality detection unit, the device characterized in that:
  the sensor unit has the first temperature sensing element, the second temperature sensing element, means for converting into a signal, information on first temperature sensed by the first temperature sensing element and information on second temperature sensed by the second temperature sensing element and for transmitting the signal, and means for transmitting the signal at a predetermined time interval; and
  the abnormality detection unit has means for receiving the signal transmitted from the sensor unit to obtain the information on first temperature and the information on second temperature from the received signal, means for calculating based on the obtained information a temperature difference between the first and second temperatures, and means for determining, upon the temperature difference being a predetermined value or more, that an abnormality has occurred in the vehicle bearing mechanism section or the vehicle brake mechanism section and thereby detecting the abnormality.

13. The vehicle abnormality detection device according to claim 6, comprising a sensor unit and an abnormality detection unit, the device characterized in that:
  the sensor unit includes a unit body arranged in the exterior of a tire air chamber and the first and second temperature sensing elements arranged in the exterior of the unit body, connected to the unit body via an electric wire and disposed in the interior of the tire air chamber, and also has means for converting into a signal, information on first temperature sensed by the first temperature sensing element and information on second temperature sensed by the second temperature sensing element and for transmitting the signal; and
  the abnormality detection unit has means for receiving the signal transmitted from the sensor unit to obtain the information on first temperature and the information on second temperature from the received signal, means for calculating based on the obtained information a temperature difference between the first and second temperatures, and means for determining, upon the temperature difference being a predetermined value or more, that an abnormality has occurred in the vehicle bearing mechanism section or the vehicle brake mechanism section and thereby detecting the abnormality.

14. The vehicle abnormality detection device according to claim 6, comprising a sensor unit and an abnormality detection unit, the device characterized in that:
  the sensor unit includes a unit body arranged in the exterior of a tire air chamber and formed integrally with a valve stem, and the first and second temperature sensing elements arranged in the exterior of the unit body, connected to the unit body via an electric wire installed through an opening of the valve stem and arranged in the interior of the tire air chamber, and also has means for converting into a signal, information on first temperature sensed by the first temperature sensing element and information on second temperature sensed by the second temperature sensing element and for transmitting the signal; and
  the abnormality detection unit has means for receiving the signal transmitted from the sensor unit to obtain the information on first temperature and the information on second temperature from the received signal, means for calculating based on the obtained information a temperature difference between the first and second temperatures, and means for determining, upon the temperature difference being a predetermined value or more, that an abnormality has occurred in the vehicle bearing mechanism section or the vehicle brake mechanism section and thereby detecting the abnormality.

15. The vehicle abnormality detection device according to claim 6, comprising a sensor unit and an abnormality detection unit, the device characterized in that:

the sensor unit has a unit body provided with the first temperature sensing element, and the second temperature sensing element arranged in the exterior of the unit body and connected to the unit body via an electric wire, and means for converting into a signal, information on first temperature sensed by the first temperature sensing element and information on second temperature sensed by the second temperature sensing element and for transmitting the signal; and the abnormality detection unit has means for receiving the signal transmitted from the sensor unit to obtain the information on first temperature and the information on second temperature from the received signal, means for calculating based on the obtained information a temperature difference between the first and second temperatures, and means for determining, upon the temperature difference being a predetermined value or more, that an abnormality has occurred in the vehicle bearing mechanism section or the vehicle brake mechanism section and thereby detecting the abnormality.

16. The vehicle abnormality detection device according to claim 6, comprising a sensor unit and an abnormality detection unit, the device characterized in that:

the sensor unit has the first temperature sensing element and the second temperature sensing element and means for converting into a signal, information on first temperature sensed by the first temperature sensing element and information on second temperature sensed by the second temperature sensing element and for transmitting the signal by radio wave; and the abnormality detection unit has means for receiving the radio wave signal transmitted from the sensor unit to obtain the information on first temperature and the information on second temperature from the received signal, means for calculating based on the obtained information a temperature difference between the first and second temperatures, and means for determining, upon the temperature difference being a predetermined value or more, that an abnormality has occurred in the vehicle bearing mechanism section or the vehicle brake mechanism section and thereby detecting the abnormality.

17. The vehicle abnormality detection device according to claim 6, comprising a first sensor unit, a second sensor unit and an abnormality detection unit, the device characterized in that:

the first sensor unit has the first temperature sensing element and means for converting into a signal, information on first temperature sensed by the first temperature sensing element and for transmitting the signal;

the second sensor unit has the second temperature sensing element and means for converting into a signal, information on second temperature sensed by the second temperature sensing element and for transmitting the signal; and the abnormality detection unit has means for receiving the signal transmitted from the first sensor unit and the signal transmitted from the second sensor unit to obtain from the received signals, the information on first temperature and the information on second temperature, means for calculating based on the obtained information a temperature difference between the first temperature and the second temperature, and means for determining, upon the temperature difference being a predetermined value or more, that an abnormality has occurred in the vehicle bearing mechanism section or the vehicle brake mechanism section, and thereby detecting the abnormality.

18. The vehicle abnormality detection device according to claim 6, comprising a first sensor unit, a second sensor unit and an abnormality detection unit, the device characterized in that:

the first sensor unit has the first temperature sensing element and means for converting into a signal, information on first temperature sensed by the first temperature sensing element and for transmitting the signal at a predetermined time interval;

the second sensor unit has the second temperature sensing element and means for converting into a signal, information on second temperature sensed by the second temperature sensing element and for transmitting the signal at a predetermined time interval; and the abnormality detection unit has means for receiving the signal transmitted from the first sensor unit and the signal transmitted from the second sensor unit to obtain from the received signals, the information on first temperature and the information on second temperature, means for calculating based on the obtained information a temperature difference between the first temperature and the second temperature, and means for determining, upon the temperature difference being a predetermined value or more, that an abnormality has occurred in the vehicle bearing mechanism section or the vehicle brake mechanism section, and thereby detecting the abnormality.

19. a sensor unit used in a vehicle abnormality detection device detecting an abnormality of at least one of a vehicle bearing mechanism section or a vehicle brake mechanism section based on the difference between a first temperature and a second temperature being a predetermined value or more in a vehicle provided with a tire including a tire wheel and a tire body mounted in the tire wheel, the sensor unit characterized by comprising:

a housing capable of being mounted in an inner side of a tire air chamber of the tire wheel and having an opening communicating the inner side of the tire air chamber with the first temperature sensing element and heat transfer means for transferring heat of the tire wheel to the second temperature sensing element;

the first temperature sensing element arranged in the housing and sensing as the first temperature any one of an air temperature within tire and a temperature of the tire body;

the second temperature sensing element arranged in the housing and sensing as the second temperature a temperature related to at least one of a temperature of the vehicle bearing mechanism section and a temperature of the vehicle brake mechanism section, characterized in that the second temperature sensing element is arranged to sense a temperature of tire wheel as the second temperature; and means arranged in the housing for converting into a signal, information on first temperature sensed by the first temperature sensing element and information on second temperature sensed by the second temperature sensing element and for transmitting the signal.

20. The sensor unit according to claim 19, characterized by further comprising means for transmitting the signal by radio wave.

21. The sensor unit according to claim 19, characterized by further comprising means for transmitting the signal at a predetermined time interval.

* * * * *